US006934376B1

(12) United States Patent
McLaughlin et al.

(10) Patent No.: US 6,934,376 B1
(45) Date of Patent: Aug. 23, 2005

(54) NETWORK COMMUNICATION SYSTEM

(75) Inventors: Thomas J. McLaughlin, Salt Lake City, UT (US); James E. Messinger, Sandy, UT (US); Ronald J. Nelson, Salt Lake City, UT (US)

(73) Assignee: NXi Communications, Inc., Salt Lake City, UT (US)

( * ) Notice: Subject to any disclaimer, the term of this patent is extended or adjusted under 35 U.S.C. 154(b) by 966 days.

(21) Appl. No.: 09/758,924

(22) Filed: Jan. 11, 2001

Related U.S. Application Data

(63) Continuation-in-part of application No. 09/040,916, filed on Mar. 18, 1998, now Pat. No. 6,181,736.

(60) Provisional application No. 60/041,458, filed on Mar. 25, 1997.

(51) Int. Cl.[7] .......................... H04M 3/42; H04M 1/56; H04B 1/38
(52) U.S. Cl. ............................ 379/212.01; 379/142.01; 375/222
(58) Field of Search ............... 379/211.01, 211.02, 379/212.01, 52, 93.01, 93.02, 93.03, 93.04, 379/93.09, 93.15, 88.12, 93.21, 93.28, 100.12, 379/100.13, 142.01; 375/222, 225

(56) References Cited

U.S. PATENT DOCUMENTS

| | | | |
|---|---|---|---|
| 3,644,896 A | 2/1972 | Chaddha | 340/172.5 |
| 4,215,243 A | 7/1980 | Maxwell | 179/2 |
| 4,268,721 A | 5/1981 | Nielson et al. | 179/2 |
| 4,466,106 A | 8/1984 | Serrano | 375/9 |
| 4,471,489 A | 9/1984 | Konetski et al. | 375/5 |
| 4,782,498 A | 11/1988 | Copeland, III | 375/8 |
| 4,924,456 A | 5/1990 | Maxwell et al. | 370/32 |
| 4,959,847 A | 9/1990 | Engelke et al. | 375/121 |
| 5,023,905 A | 6/1991 | Wells et al. | 379/96 |
| 5,029,198 A | 7/1991 | Walpole et al. | 379/88 |
| 5,065,427 A | 11/1991 | Godbole | 379/100 |
| 5,081,673 A | 1/1992 | Engelke et al. | 379/98 |
| 5,121,421 A | 6/1992 | Alheim | 379/52 |
| 5,163,081 A * | 11/1992 | Wycherley et al. | 379/52 |

(Continued)

OTHER PUBLICATIONS

Brochure for NexCom 1 modem, marketed by Nexion, Inc., undated (two pages).

(Continued)

*Primary Examiner*—Benny Tieu
(74) *Attorney, Agent, or Firm*—John R. Thompson; Stoel Rives LLP

(57) ABSTRACT

The present invention is directed to a network communication system that provides textual communication and call transferring between nodes. The system further allows simultaneous notification of multiple nodes of an incoming call. The system includes a local computer that may also serve as a node in the system. A call may originate with the local computer or be generated by a remote device that is in communication with the local computer. The local computer generates a call indicator that is transmitted to one or more nodes simultaneously. Selection of the nodes may be based on user intervention or by predefined groupings. Each node receiving a call indicator is configured to generate a ring message in response. The ring message is displayed on an output device to alert a node user to the incoming call. In response to the ring message, a node user may choose to accept or decline the call. A node user's responses to the call indicator are transmitted to the local computer. Once the local computer receives an acceptance from a node, the local computer transmits call data representative of the call to the accepting node.

33 Claims, 4 Drawing Sheets

U.S. PATENT DOCUMENTS

| | | | |
|---|---|---|---|
| 5,200,988 A | 4/1993 | Riskin | 379/52 |
| 5,311,578 A | 5/1994 | Bremer et al. | 379/97 |
| 5,325,417 A | 6/1994 | Engelke et al. | 379/52 |
| 5,327,479 A | 7/1994 | Engelke et al. | 379/52 |
| 5,327,486 A * | 7/1994 | Wolff et al. | 379/93.23 |
| 5,343,515 A | 8/1994 | Treffkorn | 379/97 |
| 5,351,288 A | 9/1994 | Engelke et al. | 379/98 |
| 5,361,296 A | 11/1994 | Reyes et al. | 379/96 |
| 5,432,837 A | 7/1995 | Engelke et al. | 379/52 |
| 5,450,470 A * | 9/1995 | Alheim | 379/52 |
| 5,473,674 A | 12/1995 | Maeda | 379/93 |
| 5,475,733 A * | 12/1995 | Eisdorfer et al. | 379/52 |
| 5,491,720 A | 2/1996 | Davis et al. | 375/222 |
| 5,588,009 A * | 12/1996 | Will | 714/749 |
| 5,687,222 A | 11/1997 | McLaughlin et al. | 379/97 |
| 6,035,187 A * | 3/2000 | Franza | 455/404.1 |
| 6,075,841 A * | 6/2000 | Engelke et al. | 379/52 |
| 6,735,286 B1 * | 5/2004 | Hansen et al. | 379/52 |
| 6,750,881 B1 * | 6/2004 | Appelman | 715/733 |

OTHER PUBLICATIONS

Brochure for Superprint modem, marketed by Ultratec, undated (two pages).

Brochure for MIC300i modem, marketed by Microflip, Inc. undated (two pages).

* cited by examiner

NETWORK COMMUNICATION SYSTEM

RELATED APPLICATIONS

This application is a continuation-in-part and claims priority to U.S. patent application Ser. No. 09/040,916, filed Mar. 18, 1998 now U.S. Pat. No. 6,181,736 which in turn claims priority to U.S. Provisional Application No. 60/041,458 filed Mar. 25, 1997.

BACKGROUND

1. The Field of the Invention

The invention relates to a network communication system and, more specifically, to local area and wide area networks incorporating an ITU/TDD/VOICE modem.

2. The Background Art

The "plain old telephone system" (POTS) has been in development since the late 1800's. Another term for POTS is "public switched telephone network" (PSTN). In general, the term PSTN will mean any medium of communication in which at least part of the link is analog, and not digital, in nature. The PSTN was first developed in the late 1800's to allow for person to person communications by voice over long distances. The invention of computers made it useful to exchange digital data over the PSTN. In the 1950's, "modems" were developed for that purpose. A modem accepts digital data, modulates it into a form suitable for transmission over the PSTN such that a corresponding receiving modem can demodulate the signal back into the original digital data.

Computer networks have become very popular in allowing computers to communicate and transmit data across local area networks (LAN) and wide area networks (WAN). The Internet itself could be considered to be a WAN. A LAN or WAN link is digital in nature and conforms to a known protocol such as NETBIOS, TCP/IP, SPX/IPX, etc. over a communication media such as Ethernet, Token Ring, or higher speed media.

Several modem protocols of the format "V dot" protocol include the V.32, V.34, and V.70 protocol. All such "V dot" protocols are promulgated by the International Telecommunications Union (ITU), the governing body for modem standards based in Geneva Switzerland. The earlier "Bell" standards, such as Bell 103, Bell 212, etc., are similar but earlier modem standards adopted in the United States prior to the U.S.'s joining of the ITU. The full specifications of any ITU standard may be obtained from the ITU.

The well known "2500" series analog phones will connect directly to the PSTN but not directly to a LAN or WAN. In the PSTN, often the link from a business or residence to the "CO" (central office) is analog, although much of the rest of the PSTN may be digital. Modems such as V.32, V.34, etc. are designed to operate on an analog or mixed analog/digital link. The term PSTN in the discussion below will sometimes include a private branch exchange (PBX) or key phone systems or links as found in many organizations. Examples of such PBX or key systems include AT&T's "Merlin"—or "Partner Plus" systems, Nortel's SL1, SL100, or Northstar systems, and so on. PBX or key systems will often connect directly to analog lines from the PSTN, although digital connections, such as T1 lines, are common. A voice caller on a PBX or key system is able to call and converse with an analog 2500 series phone whereas such a phone will not connect directly to a LAN or WAN network.

Modems provide a means for the deaf or speech impaired to communicate over the telephone system, since typed characters can be sent over the PSTN via modem and read by another modem user. However, standard modems have evolved with poor provision for communications by the deaf or speech impaired and are largely unsuitable for this purpose. Standard modems were developed primarily for computer to computer communications. For example, most standard modems have a "carrier" which is a constant audible signal. If this signal is lost because the call is placed on hold, a standard modem will generally hang up and cannot reestablish the connection with a different modem. Modems are very inflexible in their protocol requirements and will not operate properly or will abort the call if the protocol settings are wrong.

In the late 1960's, three deaf engineers developed a new type of a modem called a TDD or "telecommunication device for the deaf", sometimes called a TTY. A TDD is typically a stand alone modem system with an integral keyboard and display that allows typed characters to be exchanged with another TDD over the PSTN. Because of its simple protocol requirements, the TDD is robust and easy to use. Consequently, the TDD is, in many respects, more suitable than are standard modems for communications by the deaf.

The International Telecommunications Union ("ITU") (formerly known as the CCITT) has been active in setting various modulation standards for modems. Examples of ITU standards are V.21, V.22, V.22 Bis, V.32, V.32 Bis, and V.34. In the United States, prior to the adoption of ITU standards, various "Bell standards" were established. Examples of Bell standards are Bell 103 and Bell 212. As used herein, an "ITU modem" is a modem that may operate using an ITU modulation/demodulation protocol (or standard). Typically, ITU modems may also operate in at least one Bell modulation/demodulation protocol. A "Bell modem" may operate in a Bell modulation/demodulation protocol. Most modems currently being sold in the United States are ITU modems that are capable of transmitting and receiving in various ITU modulation/demodulation protocols as well as Bell modulation/demodulation protocols. The term "ASCII modem" is sometimes used to refer to an ITU or Bell modem.

A standard modem is a modem that runs all or some of the modem standards passed by the ITU (International Telecommunications Union), or the earlier "Bell" protocols such as Bell 103, Bell 212A, etc. Modem standard modems will typically support protocols such as Bell 103, V.34 (28,800 bps), V.32bis (14,400 bps), V.22bis (2400 bps), and so on. As used here, it is assumed that a "standard modem" does not support one or more of the modem protocols used by the deaf, such as 45 or 50 bps Baudot, EDT (European Deaf Telephone), the DTMF text telephones used in Europe, or etc. As used herein, a "standard modem" is a modem other than a TDD that follows an established protocol such as an ITU or Bell modulation/demodulation protocol and transmits and/or receives data over a communication medium. The communication medium may be a telephone system (such as the PSTN), PBX, or other media such as microwave link, coax, or fiber optic cable. ITU modems and Bell modems are examples of standard modems.

Differences between standard modems and TDDs include: (1) TDDs encode text characters with the generally obsolete five bit Baudot code, while most modems and desktop computers in the United States today use an ASCII encoding, also known as the ANSI X3.4-1977 or ASCII-77 encoding, (2) TDDs do not provide for parity bits, (3) TDDs in the United States transmit/receive only at 45.45 bits per second, and (4) TDDs use frequency shift keying modulation/demodulation at frequencies of 1400 and 1800 Hz.

Because TDDs do not use ITU modulation and protocol schemes, TDDs and ITU modems are incompatible and cannot communicate with each other.

Dual purpose modems have been developed that can communicate with both TDDs and ITU modems. Some of these dual purpose modems have the capability to determine whether incoming and outgoing signals are in TDD format or standard modem format.

The deaf or speech impaired find many products, methods, or techniques used in modem communications to be difficult or impossible to use. These problems are made even more evident with the integration of networks into communication technology. The descriptions contained here will show how new techniques and technologies can provide improved communications for the deaf and/or speech impaired.

SUMMARY OF THE INVENTION

The present invention is directed to a network communication system that provides textual communication and call transferring between nodes within the system. The network communication system may further communicate with a remote device. The system also includes the capability to simultaneously notify a plurality of nodes of an incoming call. These features provided by the network communication system are designed to benefit the deaf and/or speech impaired.

The network communication system may include a local computer that may be a node within the system. A call may originate with the local computer or be generated by a remote device that is in communication with the local computer. The local computer generates a call indicator that is transmitted to a plurality of the nodes simultaneously. Selection of the nodes may be based on user inputs or by predefined groupings.

Each node receiving a call indicator is configured to generate a ring message in response. The ring message may be displayable on an output device to alert a node user to the incoming call. The ring message may further include identification data that identifies the call. The identification data may include the origination of the call, the name of the caller, or even the nature of the call.

In response to the ring message, a node user may choose to accept or decline the call. Acceptance of the call may eliminate the option for other selected node users. Alternatively, other node users may be allowed the option to join an ongoing communication. A node user's responses to the call indicator are transmitted to the local computer. If a node user does not respond to the call indicator, the call indicator may terminate after a certain period of time.

Once the local computer receives an acceptance from a node, the local computer transmits call data representative of the call to the accepting node. The node may then respond in like fashion and proceed with the communication. In one embodiment, communication between a local computer and a node is achieved by text. Thus, exchanges of text data enable the communication. The text may be formatted in various ways on an output device based on personal preference and system configuration.

The present invention simultaneously notifies a plurality of nodes to an incoming call. Each node then has the option of accepting or declining the incoming call. Upon receiving an acceptance the call may then be transferred to the accepting node. These and other benefits and advantages of the present invention are disclosed and claimed herein.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAIL DESCRIPTION OF PREFERRED EMBODIMENTS

The present invention described herein may include hardware and features discussed in U.S. Pat. No. 5,687,222 issued Nov. 11, 1997 which is incorporated herein by reference.

Figure 1:
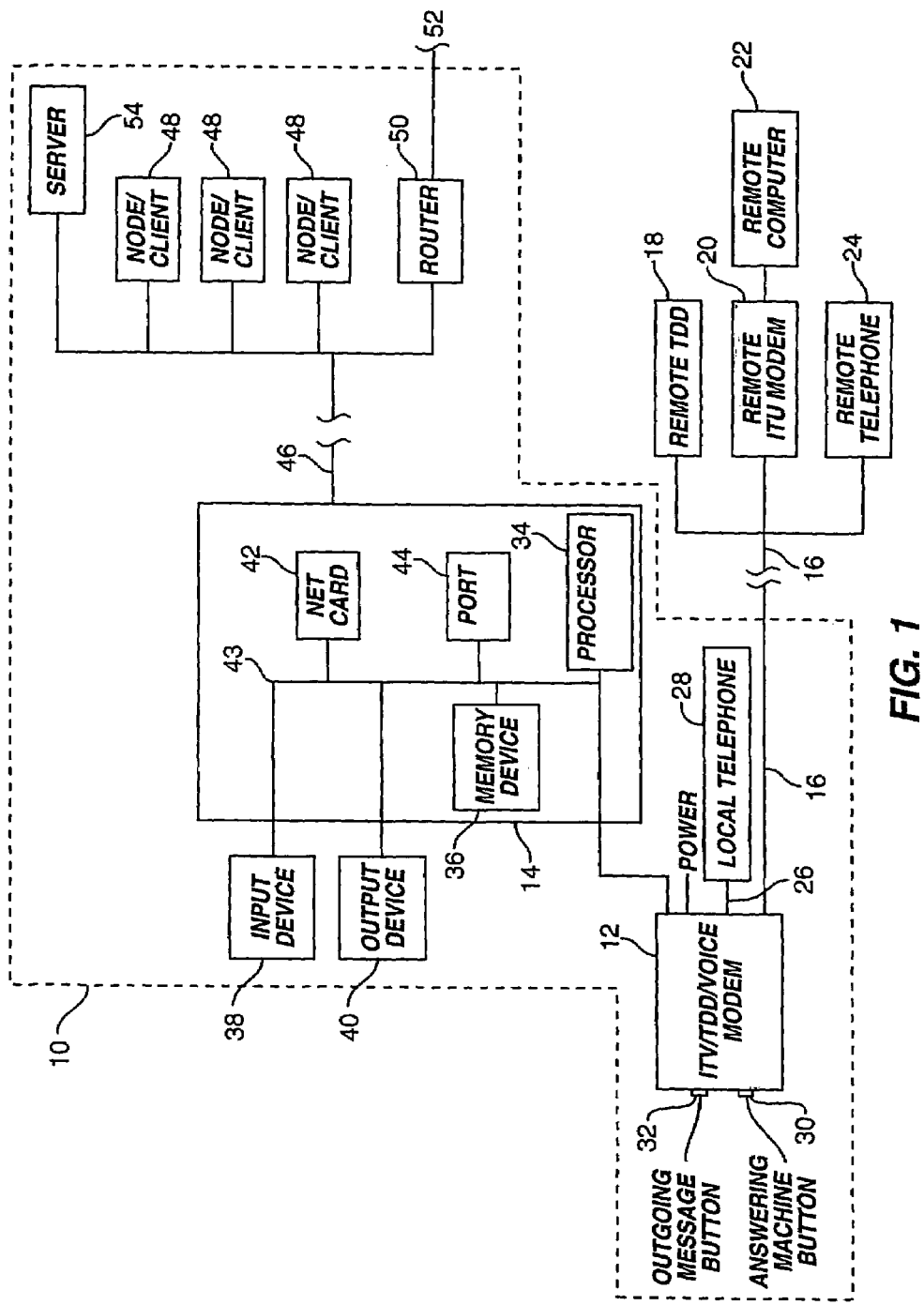
FIG. 1 is a schematic block diagram representation of the communication system in accordance with one presently preferred embodiment of the present invention including a network and a modem.

Referring to FIG. 1, the network communication system 10 includes a modem 12 which may be a standard modem. Alternatively, the modem 12 may be embodied as an ITU/TDD modem which is defined herein as a modem compatible with standard modems and one or more of the 'text telephone' standards used by the deaf. Examples of such text telephones standards are the 45/50 bps Baudot TTY's used by the deaf in the U.S., Canada, Australia, etc. or the EDT (European Deaf Telephones) used in certain countries. The modem 12 may also be embodied as an ITU/TDD/VOICE modem 14 which allows transmission and reception of ITU, TDD, and voice signals over a telephone line to and from a remote device. Voice signals could be stored on tape or in electronic memory. The modem 12 could also include ITU (or other standard modem) capabilities without detecting, recording, or transmitting TDD or voice signals. The modem 12 could further be embodied with ITU/VOICE capabilities which do not detect, record, or transmit TDD signals.

In one presently preferred embodiment, the modem 12 is embodied as an ITU/TDD/VOICE modem with features described above. In one commercial embodiment, the modem 12 may feature 33,600 bps for standard modem connections, fax at 14,400 bps, 45/50 bps Baudot TTY, voice record and voice playback, digital simultaneous voice and data (DSVD), as in the V.70 standard. Further advances in modem technology data transmissions may also be incorporated into the ITU/TDD/VOICE modem 12.

The modem 12 is in electrical communication with a local computer 14 (which may be a desk top PC computer) and a telephone line 16. The modem 12 is in electrical communication through the telephone line 16 to a remote device. Examples of remote devices include a remote TDD 18, a remote ITU modem 20 (which connects to or is internal to a remote computer 22), and a remote telephone 24. The remote device could also include a facsimile machine. In that case, the modem 12 could detect fax tones as well as Baudot, ITU answer, or voice tones.

The modem 12 may include internal facsimile capability. A separate facsimile device may also be attached to the local computer 14, internal to the local computer 14, or attached to the telephone line 16 on the local end.

The modem 12 may also include a "PHONE" connector 26 for connection to a line of an optional local telephone 28. The local user may use local telephone 28 in voice communications over telephone line 16 to, for example, remote telephone 24.

The modem 12 may operate in various modes including (1) a computer communications mode and (2) a stand alone mode. During computer communications mode, the modem 12 is controlled by local computer 14. During stand alone mode, the modem 12 operates independently of local computer 14. For example, in stand alone mode, the modem 12 may operate when (1) local computer 14 is turned off or (2) when local computer 14 is on, but the communications software of the local computer 14 is not active with respect to the modem 12.

The stand alone mode may further be divided into an answering machine mode and a prestored outgoing message mode. The modem 12 may be placed in an answering machine mode through activation of an answering machine control, which may be activated by an answering machine button 30 or a software command. (Pressing button 30 may take the modem 12 into an answering machine mode, while pressing button 30 again may take the modem 12 out of answering machine mode.) The modem 12 may be placed in prestored outgoing message mode through activation of an outgoing message control, which may be activated by an outgoing message button 32 or a software command.

The control of the stand alone answering machine and prestored outgoing message could be through a variety of techniques other than or in addition to a button. For example, the modem 12 could include electromagnetic receivers that allow activation through a remote transmitter. Another remote technique would be to control these modem modes through a computer network, either in conjunction with local computer 14 or by another network controlled device. These remote means would be particularly useful for activating the prestored outgoing message mode.

The modem 12 could also be controlled through telephone line 22 from a remote device such as a remote telephone 24, or a remote ITU modem 20, or a remote TDD. This may be particularly useful to activate the answering machine mode or to retrieve answering machine messages from a remote location.

The local computer 14 includes a processor 34 in electrical communication with a memory device 36. The memory device 36 may include one or more devices such as a hard drive or non-volatile storage device, a read-only memory (ROM), and a random access (and usually volatile) memory (RAM). The local computer 14 may include an input device 38 for receiving inputs from a user or another device. Similarly, an output device 40 may be provided within the local computer 14, or accessible electronically within the system 10. The local computer 14 further comprises a network card 42 for electrical communication with a network. The local computer 14 further comprises a port 44 for electrical communication with devices exterior to the local computer 14.

Internal to the local computer 14, a bus 43 places the processor 34, the memory device 36, input devices 22, output devices 24, network card 42 and port 44 in electrical communication with one another. The bus 43 may be thought of as a data carrier. As such, the bus 43 may be embodied in numerous configurations. Wire, fiber optic line, wireless electromagnetic communications by visible light, infrared, and radio frequencies may likewise be implemented as appropriate for the bus 43.

The input device 38 may include one or more physical embodiments. For example, a keyboard may be used for interaction with the user, as may a mouse or stylus pad. A touch screen, a telephone, or simply a telephone line, may be used for communication with other devices, users, or the like. Similarly, a scanner may be used to receive graphical inputs which may or may not be translated to other character formats. A memory device of any type (e.g. hard drive, floppy, etc.) may be used as an input device, whether resident within the local computer 14 or some other device remote to the local computer 14.

An output devices 40 may likewise include one or more physical hardware units. For example, in general, the port 44 may be used to accept inputs and send outputs from the local computer 14. A monitor may provide outputs to a user for feedback during a process, or for assisting two-way communication between the processor 34 and a user. A printer or a hard drive may be used for outputting information as an output devices 40.

The local computer 14 may be in electrical communication with a network 46 by means of a network card 42, port 44, or other interface cards. The network as defined herein may refer to a LAN, WAN, or to the internet specifically. Wire, fiber optic line, wireless electromagnetic communications by visible light, infrared, and radio frequencies may likewise be implemented as appropriate for the network 46.

In connection with the network 46, the local computer 14 may be regarded as a node in the network 46. The network comprises several nodes 48 which may have various communication capabilities. The network 46 to which the local computer 14 connects may, in turn, be connected through a router 50 to another network 52. In general, two nodes 14, 48 may be on a network 46, adjoining networks 46, 52, or may be separated by multiple routers 50 and multiple networks 52 as individual nodes 14, 48 on an internetwork.

The network 46 may include one or more servers 54. Servers 54 may be used to manage, store, communicate, transfer, access, update, and the like, any practical number of files, databases, or the like, for other nodes 14, 48 on a network 46. Typically, a server 54 may be accessed by all nodes 14, 48 on a network 46. Nevertheless, other special functions, including communications, applications, directory services, and the like may be implemented by an individual server 54 or multiple servers 54. A particular node 14, 48 may be designed to function as the server 54.

In certain embodiments, a minimum of logical capability may be available in any node 14, 48. Note that any of the individual nodes 14, 48, 54 may be referred to, as may all together, as a node 14 or a node 48. Each may contain a processor with more or less of the other components within the local computer 14.

In general, the local computer 14 may need to communicate over a network 46 with a server 54, a router 58, or nodes 48. Similarly, the local computer 14 may need to communicate over another network (52) in an internetwork connection with some remote node 48. A communication link may exist, in general, between any pair of devices.

The user of modem 12 and local computer 14 is referred to as the "local user" and the user of any of the remote devices 18, 20, 24 is referred to as the "remote user." The user of a node 48 on the network 46 is referred to as the "node user" or client.

The memory device 36 of the local computer 14 contains computer code to operate the network 46 or individual node 48 of the present invention. The computer code has several embodiments including different applications which are now described.

Server software is management software which controls the operation of the network 46. The server software enables the local computer 14 or node 48 to function as a server 54. The server software typically manages the connections of the nodes 48. If the management or control functions of the server 54 are necessary for the operation of a given node 48, then that node 48 is considered to be in the "domain" of this server. In one presently preferred embodiment, all node users will "register" with the server 54, and will provide information such as first name, last name, department, login name, menu choice name, phone number and/or PBX extension, and so on at the time of registration. The server 54 may record a node user's preferences as to how to deliver mailbox messages (email, fax, to a node, pager, to voice mail via text-to-speech, etc.). Any node users registered and managed with a server 54 are considered to be within this server's 54 domain. Similarly, any modems which are controlled by the server 54 are also in the server's 54 domain. The server 54, will have sufficient memory to maintain a server database relating to the nodes 48 in the network 46. The server 54 will typically maintain a node user's "mailbox" in the central database, so any messages for a certain person or department in its domain are recorded centrally and then forwarded according to the node user's preferences.

The server 54 will normally have a mediation role in connections. For instance, when software loads on a node 48 to enable the node 48 to join the network 46, it will register its presence with the server 54 and will provide its IP address. This allows operation in a dynamic IP addressing scheme. Now, if one node 48 wishes to call another node 48 then the client software of the first node 48 will contact the server 54 and request the IP address of the second node 48. The server 54 will provide the needed information so that the call can be made, as well as further information if desired from the user's registration information.

The present invention allows for call conferences which may be "hubbed" from the server 54, so that each node session talks to the server 54. Text from a node session is sent to a server conference object, and then forwarded by the server 54 to each participant in the conference call in a packet format. An advantageous feature of the invention is that text from a remote device such as a remote TDD 18 or a remote modem 20 is similarly hubbed to the server 54 in a conference call. This may be done with the remote TDD 18 or remote modem 20 in electrical communication with the local computer 14 regardless of whether the local computer 14 is enabled as the server 54. Thus, as defined herein, a participant to a call conference may include a node 48, a remote TDD 18, or a remote modem 20.

In one presently preferred embodiment, communications between two systems, whether the server 54 or a node 48, will be in a data packet protocol. If two or more conference participants are typing at the same time, then the server 54 packetizes this text and sends it to each participant. The text typed by each participant can be sent in separate packets, each with an ID header to identify the source of the text. Alternatively, individual sections within a single packet can provide ID information as to the text source.

The receiving participant will separate the text from the packet or packets into the appropriate individual window if a multi-split screen format is being used. The multi-split screen format is explained in greater detail below. This same packet system allows a standard modem session to support two or more independent calls on a single phone line, and it allows a node session to support more than one conversation at a time.

In one presently preferred embodiment, the server database is accessible throughout the network to maintain the status of registered node users, active (available) users, registered remote users, available modems, and so on.

The server 54 may also provide call flow information for remote modem sessions. An incoming call may be answered by remote modem software which provides "call flow information" to provide menus, choices (with branching), or actions to a caller. The server 54 architecture also supports the remote modem session accessing the call flow information independently from a centralized or local database.

Node software is software running on a node 48, such as a networked computer, and is defined herein as any software or software technique used to send and receive text, audio sounds, or video to a computer over the network 46. Node sessions will normally be 'packet oriented' and work over TCP/IP or etc. In one presently preferred embodiment, the node software presumes that the node 48 does not have a local modem but rather uses a network modem. Also, the node software may include a "network phone book" which is maintained centrally by the server 54 and which shows the "registered" users of the network 46 as well as those user's currently logged on. The node software includes a menu to retrieve any mailbox messages for the current node user stored on the network 46, as well as a method to view/change the mailbox greeting for the current node user also maintained on the network 46. The node software further allows the node user to see the status of modems on the network 46.

There are at least two basic approaches to the installation of the node software on a node 48. In one approach, compiled software is installed on the node 48, either by floppy disk, CD ROM, or over the network 46 from a central location. In a second approach, the node user loads a web browser such as the Netscape or Microsoft IE (Internet Explorer) software. The node software can then be downloaded to the browser as a Java applet, Active X (TM) control, or similar approach. Alternatively, a purely HTML approach may be employed where text is sent/received from the user's browser screen, and the form, of this screen is manipulated as desired using only HTML commands.

Modem software is a program that may be loaded on the local computer 14 for control of the modem 12. In one presently preferred embodiment, high level commands such as "dial <string>", "hang up", etc. are passed to the local computer 14 controlling the modem 12 by a node 48 or server 54. The modem software performs the lower level modem commands/control. The modem software maintains network connections (TCP/IP sockets, etc.) so that it's modem becomes a network resource. If a call is received, then the modem software can execute a "call flow script" to provide automated services.

In one embodiment, the modem software controls an ITU/TDD/VOICE modem to allow direct calls to a remote TDD 18 or remote modem 20. If a remote ITU/TDD/VOICE modem calls into a local modem 12 in electrical communication with the network 46, then the modem software can cause the ITU/TDD/VOICE modem to function as a node and switch to a packet protocol. The network 46 can allow the remote user to log on as a client and be treated at that point as any other node 48, with full access to the network phone book, modem listings, etc. in a graphical screen format.

The distinguishing feature between the node software and the modem software is that the modem software will always control a modem 12 attached to the local computer 14, while the node software need not have a local modem 12 since communications occur over the network 46. As mentioned above, a remote device can connect to a network 46 using a modem 12, and enter into a packet protocol as any node session. Any node 48 can control a modem in electrical communication with the network 46 to make a modem connection with a remote device. Of course, the local computer 14 or node 48 can operate the node software and modem software in separate windows simultaneously for node sessions and remote sessions.

Standard modem software is communications software which is run on a computer to control a local "standard modem." A standard modem is define herein as a modem which does not support one or more of the text telephone protocols used by the deaf. For instance, the 45 bps Baudot TDDs used by the deaf in the U.S., Canada, and other countries will not communicate with most of the standard modems sold in the world (as of 1997) since most or many of these modems do not support the 45 bps Baudot FSK modulation used by TDDs. The standard modem software, like the previously discussed modem software, permits a remote standard modem to call over the PSTN into a modem 12. The remote standard modem may then become a node 48 to the network 46. This feature allows most or all of the screens supported for a node 48 to also be supported on a remote computer in electrical communication with the remote standard modem. Accordingly, a remote standard modem user can see the network phone book, retrieve mail from the network 46, take part in multi-screen conference calls, support local/remote split screen activation, call "outside" the network 46 using a second modem in electrical communication with the network 46 to a TTY, and in general take part in all the features of the node software.

Figure 2:
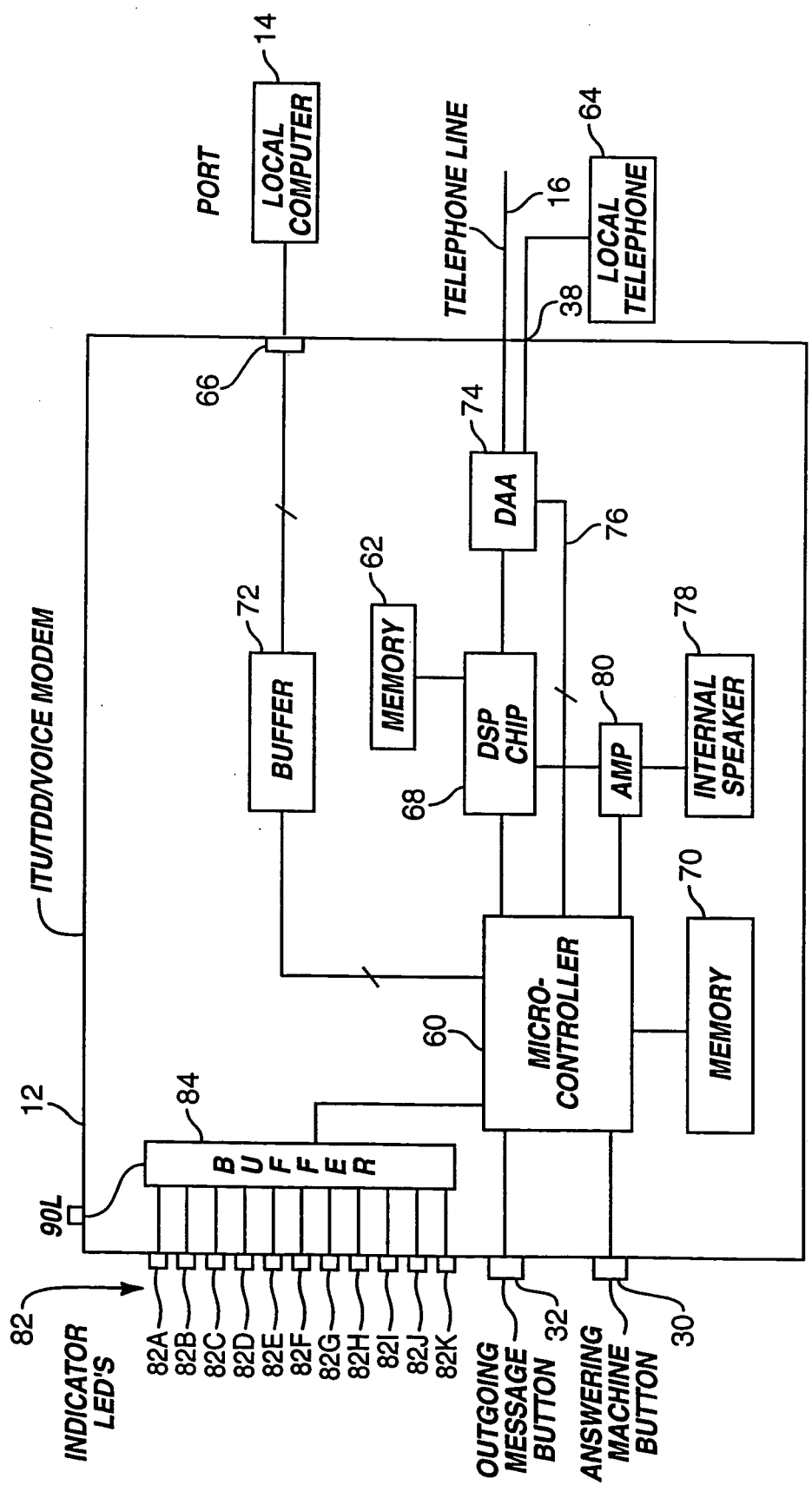
FIG. 2 is a more detailed schematic block diagram representation of a preferred embodiment of an ITU/TDD/VOICE modem.

Referring to FIG. 2, the modem 12 is shown in one presently preferred embodiment as an ITU/TDD/VOICE modem. The modem 12 includes a micro-controller 60 and a memory 62. The memory 62 typically contains at least two prestored messages, one for prestored outgoing message mode and one for answering machine mode. (It is possible, but unlikely, that the messages for prestored outgoing message mode and answering machine mode would be identical). The messages may have been prestored by the manufacturer or someone else other than the user, or may be created and stored by the user through, for example, the local computer 14. In that case, the user will typically type the desired prestored outgoing message and/or the answering machine mode greeting on an input device 38 of the local computer 14 and transmit this text to the memory 62 of the modem 12 for storage. (The message may even be changed remotely.) One or more prestored voice message may also be contained in memory 62.

Means of entering voice signals include recording through telephone line 16; local telephone 64; a microphone via sound card; a microphone via audio-in; or sound card through the RS-232 port 66. Voice signals may be synthesized in a sound card, DSP chip 68, or local computer 14.

The local computer 14 includes a DSP chip 68 in electrical communication with the memory 62, which may be internal to or external to DSP chip 68. Voice signals may be stored in memory 70 and/or memory 62. DSP chip 68 typically provides the ITU modem functions and audio processing for voice functions. The TDD modem functions may be supported by either DSP chip 68 or microcontroller 60.

The local computer 14 is connected to micro-controller 60 through a EIA-TIA 232 port (formerly called "RS-232" and also known as a V.24 port) 66 and a buffer 72. The port 66 will be called an RS-232 port herein. Alternatively, the ITU/TDD/VOICE modem 12 may be a plug-in card internal to local computer 14, or the functionality of modem 12 may be incorporated in the circuitry of local computer 14.

Telephone line 16 is connected to micro-controller 60 through data access arrangement circuit (DAA) 74 and DSP chip 68. Line 76 is a digital ring indicator line. A codec (ADC and DAC) is included in DSP chip 68 or between DSP chip 68 and DAA 74, for processing signals to and from DAA 74.

The ITU/TDD/VOICE modem 12 may include an internal speaker 78, which is connected to the micro-controller 60 and/or DSP chip 68 through an amplifier 80. When an incoming call is received, a local telephone 64 (if present) is connected to line 16 through DAA 74 and will ring to signal an incoming call. Alternatively, or in addition, internal speaker 78 will transmit audible sounds. The presence of an incoming call may be indicated through a variety of other means including a separate telephone or some other signalling device (using light, vibration, or sounds).

The ITU/TDD/VOICE modem 12 may provide call progress monitoring messages (e.g., busy, ringback, ringing, carrier status, dial tone, etc.) to the screen of local computer 14.

The ITU/TDD/VOICE modem 12 may also provide a visual indication of sound energy on telephone line 16 to the screen of local computer 14. This last function would be most useful in the internal card version of ITU/TDD/VOICE modem 12 to replace the function of the external indicator LED 82C described below.

The ITU/TDD/VOICE modem 12 may include various indicator lights 82 that are activated through a buffer 84. For example, one embodiment of ITU/TDD/VOICE modem 12 includes light emitting diodes (LEDs) 82A–82K that provide the following information.

LED 82A monitors RS-232 port 66 and indicates that signals are being transmitted from local computer 14 to ITU/TDD/VOICE modem 12. LED 82A may be referred to as an "Out" or "TX" light.

LED 82B monitors RS-232 port 66 and indicates that signals are being transmitted from ITU/TDD/VOICE modem 12 to local computer 14. LED 82B may be referred to as an "In" or "RX" light.

LED 82C indicates that sound signals which exceed a certain amplitude threshold are on telephone line 16. The ITU/TDD/VOICE modem 12 may include a programmable amplitude threshold which governs the activation of the LED 82C. LED 82C gives a deaf user information about the remote call. For example, a ringing or busy signal will generally cause the light to flash with a distinctive cadence. Voice signals generally cause LED 82C to flash irregularly.

LED 82D indicates that ITU/TDD/VOICE modem 12 is receiving power.

LED 82E indicates that ITU/TDD/VOICE modem 12 will automatically answer telephone line 16, and may be referred to as an "AA" light.

LED 82F indicates ITU/TDD/VOICE modem 12 is connected to telephone line 16, and may be referred to as an "OH" or "off hook" light.

LED 82G indicates ITU/TDD/VOICE modem 12 is in an autodetect mode and will discriminate between TDD and ITU formats in answering or calling mode.

LED 82H (if LED 82G is off) indicates that the ITU/TDD/VOICE modem 12 has been set to operate as a TDD.

LED 82I (if LED 82G is off) indicates that the ITU/TDD/VOICE modem 12 has been set to operate as an ITU modem.

If LED 82G and LED 82H are on, ITU/TDD/VOICE modem 12 is in autodetect mode, and the active call is in TDD mode.

If LED 82G and LED 82I are on, ITU/TDD/VOICE modem 12 is in autodetect mode, and the active call is in ITU mode.

LED 82J indicates ITU/TDD/VOICE modem 12 is in answering machine mode.

LED 82K indicates a data message has been received and stored in memory, such as memory 70.

LED 82L indicates a voice message has been received and stored in memory, such as memory 62.

As used herein, a telephone call includes any signal over telephone line 16, whether originating from a telephone (voice call), an ITU/TDD/VOICE modem, a TDD, a standard modem, a facsimile machine, or other remote device. The present invention may be employed in connection with a private branch exchange (PBX) system, in which case telephone line 16 might not be part of the PSTN.

The ITU/TDD/VOICE modem 12 may include an "ITU/TDD autodetection" feature that determines whether signals are in Baudot or an ITU or similar format. When ITU/TDD/VOICE modem 14 originates a call over the PSTN, ITU/TDD/VOICE modem 12 goes off-hook, dials the outgoing call, sets its detectors to "listen" for TDD Baudot frequencies as well as ITU modem answer tones, and then connects appropriately according to the signals received. When an incoming call is received by the ITU/TDD/VOICE modem 12 through line 16, the ITU/TDD/VOICE modem 12 first answers the call by going off-hook and then transmits an ITU answer tone for a few seconds. If a calling ITU modem responds, the ITU "handshake" or call negotiation process is begun and the connection established. If no ITU calling modem response is elicited, the ITU/TDD/VOICE modem 12 may transmit in TDD Baudot format to attempt TDD communications with the caller.

The ITU/TDD/VOICE modem 12, while transmitting an ITU answer tone may simultaneously set its detectors to listen for Baudot TDD signals. If the remote caller is using a TDD and transmits TDD characters, the ITU/TDD/VOICE modem 12 may immediately abort the ITU answer tones and switch to TDD mode.

Alternatively, with an incoming call, the ITU/TDD/VOICE modem 12 may go off hook and first transmit Baudot TDD characters to elicit a response from a TDD caller. This attempt can be followed by the ITU answer tone, if necessary, to attempt connection with an ITU modem.

The ITU/TDD/VOICE modem 12 can add the detection of voice to the above "ITU/TDD autodetection" procedure to create an "ITU/TDD/VOICE autodetection" procedure. In call originate mode, after dialing the phone number, the ITU/TDD/VOICE modem 12 can set its detectors to listen for either an ITU answer tone, TDD tones, or voice signals and connect accordingly.

In call answer mode, the ITU/TDD/VOICE modem 12 can operate as follows during the ITU/TDD/VOICE autodetection procedure.

In a preferred embodiment, the ITU/TDD/VOICE modem 12 will first transmit a voice message such as "This is ABC Agency. If you have a touch tone phone please press one now . . . " If a DTMF "1" is received by the ITU/TDD/VOICE modem 12 then the call is determined to be a voice call and the ITU/TDD/VOICE modem 12 can proceed as a voice answering machine or information retrieval system. However, if a DTMF "1" is not received, then the ITU/TDD/VOICE modem 12 can proceed to enter the ITU/TDD autodetection mode described above so as to ascertain whether the call is from an ITU or TDD modem.

Alternatively, if the DTMF "1" is not received, the ITU/TDD/VOICE modem 12 can transfer or cause to transfer the call to a human operator, or otherwise signal a human operator to attempt to talk to the caller. The human operator will typically ascertain if the caller is a voice caller not using a touch tone phone. If no voice response is elicited by the human operator, then the human operator can cause the ITU/TDD/VOICE modem 12 to enter the ITU/TDD autodetection mode described above and attempt an ITU or TDD connection with the caller.

Alternatively, the initial voice message can request that the caller speak. A typical initial voice message might be "This is ABC Agency. If you wish to use our automated voice system please say "YES now." The ITU/TDD/VOICE modem 12 will now listen for voice signals on the telephone line 16, and if received will proceed as a voice system. If no voice response is received then the ITU/TDD/VOICE modem 12 will enter the ITU/TDD autodetection mode and attempt to connect with an ITU or TDD caller.

The order of the steps explained above may be varied. For example, the ITU/TDD/VOICE modem 12 may first enter the ITU/TDD autodetection procedure, and if an ITU or TDD connection is not successful then transmit a voice message to attempt to elicit a response from a voice caller.

Further, the addition of facsimile detection is easily added to the above ITU/TDD autodetection or the ITU/TDD/VOICE autodetection procedures. For example, in call answer mode, the ITU/TDD/VOICE modem 12 can, after going off hook, also listen for calling tones from a facsimile machine. Similarly, in call originate mode the ITU/TDD/VOICE modem 12 can listen for facsimile answering tones, in addition to listening for ITU modem, TDD, and/or voice signals.

It is noted that the ITU/TDD/VOICE modem 12 can be internal (e.g., as a card) to a local computer (similar to local computer 14) or built into the circuitry of local computer 14. In either case, the local user can operate other software (e.g., word processing software) while the ITU/TDD/VOICE modem 12 operated in stand alone mode. Answering machine button 30 and outgoing message button 32 can be external to the local computer and connected to the card through a cable or mounted on the back of the card.

The following are features that may be performed by the network/modem system 10 of the present invention. It is noted that various embodiments of the network/modem system 10 may include some, but not others of the features.

1. Call Scenarios and Test Transfer Services

There are three basic call scenarios with just two parties on the call: (1) the call is originated from within the network communication system 10 and is dialed out to a remote device over the PSTN, (2) the call originates from a remote device and rings into the modem 12 on the network communication system 10, and, (3) the call originates and terminates within the network communication system 10 and never goes over the PSTN. There are also "mixed" calls where three or more parties are conferenced, and each party may have independently originated/answered a call from the network or PSTN side. Each of the these three basic two party call scenarios will now be described in further detail.

In call scenario 1 the call originates from within the network communication system 10 and dials out over the PSTN to a remote device. If a node user at a node 48 wishes to call out over the PSTN to a remote device then the node software will make a request out over the network communication system 10 for an available network modem. Modem 12 is illustrated as one network modem, although the network communication system 10 may obviously have several network modems. The server software will mediate these requests and provide information to the requesting node software as to the network address(s) (TCP/IP address etc.) of available network modems. The network modem, such as modem 12, is in electrical communication with a local computer 14 running modem software as previously described. The requesting node software will provide the desired phone number to the modem software, and the call will be dialed out. In effect, the modem software can make available its associated modem 12 to any node on the network communication system 10 for outgoing calls to remote devices over the PSTN.

Sound level information can be sent across the network 46 to the node 48. The node software can display an on-screen "sound light" an output device such as a monitor. Such a light can convey useful information as to the sounds occurring on the PSTN line. For instance, it will flash with one cadence for a busy signal and another cadence for a "ring back" signal, and will flash more irregularly if there are voice sounds on the PSTN line.

If is also possible to convey information regarding the amplitude of individual sound frequencies present on the PSTN line in communication with the modem 12. This information may be relayed to a node 48 across the network 46. For instance, a bar chart where each bar is a specific frequency and its height reflects tile sound amplitude for that frequency could be sent across the network to the node 48. Other graphical display methods will be apparent. The modem 12 already collects information from multiple digital band pass filters so this information is available and could be sent across the network 46 to any node session. Such a frequency/amplitude display would show the node user further information about the sounds present on the PSTN line. Call progress energy in the lower frequency bands, such as busy or ringback, will look different than voice energy which is spread across a wider frequency band. Consider that even for hearing node users the modem 12 and PSTN line could be miles apart from the node 48 and the modem speaker may be out of earshot.

In call scenario 2, a call is received by a the modem 12 from a remote device such as a remote modem, remote TDD, voice caller, or fax. The modem 12 with voice capability can speak a voice message such as "Please press one on your touchtone phone," and the modem 12 could then set its DTMF "dialing tone" detectors to an active state. If a DTMF "one" is received, then the modem 12 can continue as a conventional IVR (interactive voice response) system. If a modem or fax calling tone is present on the line then the modem 12 can respond appropriately. Examples of calling tones include: fax calling tones, TDD Baudot tones resulting from an automated TDD "ID" signal or someone pressing a key on a TDD keyboard, "TurboCode (TM)" ID tones, or some other modem calling ID signal or tone. If there are no DTMF, ID, or calling tones present, then the answering modem 12 can next begin an active interrogation to discriminate between a conventional rFU modem (such as a V.32 or V.34 modem), a Baudot TDD, or some other modem standard. An active interrogation may include modem answering tones such as V.25 or Baudot TTY tones to elicit a response from a calling device.

The present invention offers various features to a remote user using a remote device who is connecting to the network communication system 10. These same services can be offered to a remote modem 20, a remote TDD 18, or a remote telephone 24 with a voice caller in voice mode such as in a conventional "IVR" (interactive voice response system). These services are now discussed.

One feature of the present invention is the call transfer service for a remote text user using a remote modem 20 or remote TDD 18 who is calling into the network communication system 10. Most remote modems connecting to a network will not tolerate a call transfer where the call is placed on hold and transferred to another extension in the network. The reason for this is that first, most standard modems will hang up if the modem carrier is interrupted by placing the call on hold. Secondly, most standard modems are not easily capable of renegotiating a modem connection on a call transfer. For instance, if the remote modem was the answering modem and so was using the answer band modem frequencies, on a call transfer it must flip to being the originating modem and use the originating modem band frequencies, even though it did not dial a phone number. These issues present difficulties for standard modems in allowing call transfers to modems on different phone extensions.

Call transferring begins with a remote text user using a remote TDD 18 or a remote modem 20 dials into the modem 12. If the remote text user dials in using a remote modem 20, then a modem carrier connection is established between the remote modem 20 and the modem 12. At this point the remote text user is able to converse in real time with the local computer 14 user through transmission of textual characters. If the remote text user wishes to chat in real time with a user on a node 48 within the network communication system 10, then a call transfer to the specified node 48 or department may be attempted. A department may be defined as a plurality or group of specified nodes 48. The department of nodes may be determined previously or may be selected at the time of the call.

There are various techniques to alert a node 48 or nodes 48 that a call transfer is being attempted. One method involves the use of a graphic window referred to herein as a pop up ring box. The ring box is described in further detail below.

The call transfer feature described herein allows a remote modem 20 or remote TDD 18 call into the network communication system 10 through a modem 12 to be transferred to any node 48 on the network communication system 10. The modem 12 interprets the textual data received from the carrier based modem connection and converts the textual data by formatting the textual data into a format compatible with the network communication system 10. This allows a call transfer to occur even if the connection from the modem 12 to the remote device is a carrier based modem connection such as Bell 103 300 baud, V.32 9600 bps, or etc. If the connection between the modem 12 and the remote device is carrier based, then the modem 12 converts the textual data by eliminating the carrier signal. Call transfers occur by the local computer 14 redirecting the textual data over the network communication system 10 to a node 48. The textual data may then be directed to any node 48 or nodes on the network as desired by either the remote text user or the local user. Thus, the modem carrier connection from the modem 12 to the remote modem 20 or remote TDD 18 is never interrupted.

The node 48 may respond to the textual data by sending response data to the local computer 14 and then through the local modem 12 to the remote device. The local computer 14 may also route the textual data to other nodes 48 in the network. The local computer 14 may also participate in the text communication by displaying the communication and generating and transmitting textual data to the remote device and the node or nodes 48. In this manner, a textual call may be transferred to a node 48 in the same manner that a voice call is transferred.

In one embodiment, the modem 12 may be an automated network modem for serving network communications. The local computer 14 may also be an automated station for controlling the modem 12 and interfacing with the network communication system 10. Automated is defined as not necessarily requiring human interaction for call transferring. In this embodiment, the textual call is received by the modem 12 and then converted to a suitable format for the local computer 14. The local computer 14 then automatically transfers the textual data to a node 48 on the network. Selection of the node 48 may be accomplished by a default setting by the local computer or it may be selected based on a node address transmitted within the textual call.

The node 48 receives the textual call which is then displayed on an output device, such as a monitor. A node user may then select another node or nodes 48 and transfer the textual call across the network communication system 10 to that node or nodes 48.

Prior to transferring the textual call, the node user may send an inquiry to the user of the remote modem regarding the nature of the call, identification, and so forth. Based on the remote user's response, the node user may decide to transfer the call or terminate the call as desired. The node user may alert a selected node or nodes 48 as to the identification or nature of the call by transmitting this information within a pop up ring box.

The node user may continue to actively participate in the communication or may withdraw as desired. A selected node or nodes 48 may continue in the communication, may transfer the textual call to additional nodes, or may discontinue as desired. All communication continues with the remote modem by the modem 12 maintaining the communication connection with the remote modem.

As is discussed below in the section "Conference Calls and Multi-Call Support," the invention can make possible 3 or more way split screen chat sessions where 3 or more user's can take part in a text telephone "conference call," even if one or more of them are on the not initially party to a standard modem connection.

Another feature is referred to as a the faxback service. This allows a remote user to select a fax from a listing and the modem software will automatically fax the remote user back with the delivered fax, or, hand off the fax request to a fax server elsewhere on the network.

An additional feature is the information menu service. The remote user may enter an information menu and type a topic name. Information on this topic will then be sent to the screen of a remote device.

Yet another feature is the file download menu service. The remote user may enter a menu of available files and request a file download. The requested file will then be sent via Zmodem, Xmodem, or etc. to the remote user.

Still another feature is a messaging taking service for remote text users to leave messages for selected individuals, departments, or the entire organization. The message may be a general message to the organization, or, it may be directed to a specific "mailbox" for an individual or department in the organization. The methods of delivering such text messages will normally be invisible to the remote text user, and include sending the test message as a conventional email to the appropriate account, sending the text message directly to a node 48, sending the text message to a pager or fax, and even placing the text message into a voice mail account using text-to-speech as discussed below. In other words, the remote text user will leave a message for a person or department and need not know details on how this message will be delivered. Different techniques for alerting a person or department that a message is pending are discussed below.

Another feature is message forwarding to an arbitrary email account, fax number, pager, and so on. A remote text user connecting to the network communication system 10 can be offered message forwarding services to arbitrary email account(s), fax number(s), pager(s), etc. This feature is different from the message taking service described above. In the "messaging taking service for text callers to leave messages for selected individuals, departments, or the entire organization" service just described the remote text user will usually leave a message for a certain person or department and need not know how this message will be delivered. In the present service, the remote text user can specify an arbitrary email address, fax number, and so on. If this option is made available and is selected by the remote text user, then the local computer 14 connected to the modem 12 receiving the call will accept the text message from the remote text user, and then ask the remote text user to specify the text forwarding or delivery method to be used. If the remote text user specifies email delivery, then the local computer 14 will request an email address or addresses. If fax forwarding is specified, the local computer 14 will request the fax number or numbers. If pager delivery is specified, then the local computer 14 will request the pager number and pager ID information. A particular utility of this service is that the remote text user may not have access to a fax machine or computer to send an email or alpha page. However, using a try or standard modem the remote text user can call into the network communication system 10 and leave a text message to be delivered by network communication system 10 to these types of devices.

It is noted that TDDs using the Baudot character set do not support all the text characters which may be found in an email address. An example of an email address might be: "test@company.com/~fred." The "at" symbol after the word "test," and the "tilde" character before the word "fred," are characters which are not supported in the Baudot character set. The local computer 14 may address this problem by instructing a remote TDD caller to type the word "at" for the "at" symbol, and the word "tilde" for the tilde symbol. Similar methods to replace non-supported characters with supported text will be apparent, and this technique can be used with other non-supported characters as well.

An important feature of the text services described is that the services offered by the network/modem system can be tailored for the speed and type of the particular connection between the modem 12 and the remote device. Thus, network responses may be modified based on the type of modem connection achieved or the phone number of the remote user. For instance, it might be reasonably fast to offer a 10 page text document to a high speed remote modem user, but sending this document to a remote TDD user at 45 baud would take an excessively long time. This specific information might be made available to a TDD user only as a "fax back," and not as a text send. Also, the text sent to a TDD user might include the common abbreviations used by the deaf on normal TDD calls, while the text sent to a modem user would not include these abbreviations. Certain services, such as file download by Zmodem or Xmodem, are not possible with most TDDs.

For the above reasons, the present invention includes a feature whereby the system behavior of the connection may be set, "on the fly," differently for high speed versus low speed calls, or "big screen" versus "small screen" calls. When the modem software answers a call and makes a data connection, the appropriate "call flow" will be engaged. One call flow with certain options may be established for high speed connections and an independent call flow for low speed connections, such as TDD calls, may be established.

The independent call flow concept above is also available in other situations. For instance, if the network communication system 10 obtains automatic number identification information from a PBX or central office, or "caller ID" information from a PSTN line, then different call flows may be engaged which depend on this information. So, if a caller calls the "Division A" phone number, that caller may receive a different system response with different services than a caller calling the "Division B" phone number. A different call flow may be invoked depending on the caller's own phone number. For instance, important customers may see "Call Flow A" while regular customers will see "Call Flow B." The network database can also be used to direct the modem software to answer a certain call in a different manner depending on the phone number of the incoming call. So, for instance, if the database shows a given number to be from a TDD, high speed modem, or voice caller then the method of answering could be customized and start out as TDD Baudot, high speed modem, or voice as indicated.

A third call scenario exists wherein a call is originated from within the network communication system 10 and the destination is also within the network communication system 10. Calls within the network communication system 10 can be made without a modem or PSTN line. The node software allows both outside (through the PSTN) and inside (through the network communication system 10) calls. Originating, or receiving, a PSTN or network call is very similar. Network calls may automatically have "caller ID" since each node user may be registered with the network, and because the caller's name is known the incoming call "ring box" can show who is calling on the receiving node computer screen. Alternatively, the node software can itself provide the originating user's name or other information as desired in packet format, which can be displayed on the ring alert box on the recipient's system as desired.

Any call attempt that is not successful, whether originating from within the network or from across the PSTN, will receive an option to leave a message in the person's or department's text "mailbox." Mailboxes are maintained on the server 54 and not on individual nodes 48. Each person or department can modify their mailbox greeting at any time on this central database. So, even if a particular node computer is off or unavailable a network or PSTN caller will receive the appropriate mailbox greeting. Mailbox messages are forwarded (delivered) automatically or according to the user's preferences as discussed below.

Two or more independent text conversations can be allowed at one time. The remote parties can be within the network or can be remote users through a remote modem 20 or TDD 18. Two or more independent conversations can be conferenced as explained below in further detail.

There are call scenarios which are not inside-to-inside (within the network), inside-to-outside, or outside-to-inside. There are many examples of these more complex call scenarios, and the examples listed here are not meant to be complete.

As one example, a remote TDD or remote modem user may wish to call another TDD or modem but this call would normally incur long distance PSTN charges. One technique to avoid these charges would be to make a call to a closer network modem 12 and request a second network modem to complete the call. This is an example of an outside-to-inside-to-outside "mixed" call scenario.

The remote user, or the network communication system 10, can select a second modem which is closer to the destination TTD or modem. As an example, a remote modem user in New York might call a network modem in New York and provide a phone number in Chicago to call. If the network is a WAN which extended to Chicago, the network could automatically ascertain that a network modem in Chicago would be most economical for that area code, and complete the call to the destination PSTN number using the Chicago network modem. Thus, there need not be any PSTN charges from the telephone company.

The network/modem system 10 can be programmed with all the area codes used in the U.S. and other countries and use this information to find the most economical way to complete an outgoing call from a node user or remote user. This may be accomplished by linking to the modem closest to the target PSTN number to call out from the network communication system 10. Making modems available to network communication system 10 over the Internet could make calls from one modem to another around the world appear as "local" calls to the PSTN companies.

2. Conference Calls and Multi-Call Support

One feature of the invention is the ability to allow three or more people to call conference with one another and to all participants the ability to type at the same time. These users may be node users within the network communication system 10, remote TDD users outside the network communication system 10, remote modem users, or any combination of these listed. Another objective of the invention is to allow a node 48 or a remote modem user to support two or more independent calls on the same computer. The remote modem user has the ability to support two or more independent calls over a single phone line where the remote parties are node users, TDD users, or standard modem users.

While there are other approaches to the problem, one presently preferred embodiment uses a packet protocol. A node user or remote modem user will receive text typed by remote users in packet form. Each packet will have "ID" information as to the source(s) of the text. The text from a particular remote user can be received in a dedicated packet identified as to its source, or, a single packet might have text from two or more remote users. In the latter case, the text inside the single packet will have ID information as to each source. Once a node or remote modem receives a packet, it can separate out the text from each source into individual windows of a split screen call conference display, or into independent windows if independent calls are being supported.

In a preferred implementation of call conferencing, in order to support the packet approach, the server software of the network communication system 10 acts as a conference hub. A node 48 or remote device will communicate with the network communication system 10, and not directly with another node 48 or remote device. The network communication system 10 will take the text from each text source and packetize it, with any other pending text, into packets and send it to each call participant. An alternate approach is that each participant in a call conference sends its text directly to every other participant in the call conference, and this latter approach could be used.

The central hub approach has advantages in that the network hub can control the conference call and can keep track of node 48 or remote device users joining or leaving the call conference more easily than each participant can. Another advantage is that it is simpler for each user to send text only to the network hub and let the network communication system 10 distribute the text to all call participants. Yet another advantage is that the network communication system 10 can combine text from several participants into a single packet to thereby reduce network traffic. In a situation where a node 48 or a remote device is communicating with a network communication system 10, then independent conversations can be supported with packets and packet IDs. For instance, a remote device connected to a modem 12 on a network can become a "client" just like a node 48. As a client the remote device user might make a second call, either to a node 48 or to another remote TDD or another remote modem by requesting a second network modem and making an outside call over the PSTN. This second independent call can be kept separate from the first call by the packet ID technique used in conference calls.

Another technique of keeping multiple conversations separate is to set up independent network addresses for each conversation. For instance, in the TCP/IP protocol each conversation can be assigned unique TCP/IP sockets with a unique TCP/IP port number. In this latter method the text stream from one conversation can be kept separate from another conversation.

Provision can be made to combine separate conversations into a conference call. For instance, if a user had four independent conversations in progress, he might conference three of them into a four participant (counting himself) conference call, but leave the fourth call as independent. An advantage of the conference hub on one computer discussed above is that any one participant in a conference call can hang up and leave the call without cutting off or disturbing the on going call between two or more remaining participants.

A useful feature of the call conferencing just discussed is that it allows a user to act as a call mediator. For example, suppose a citizen calls a government office and explains a problem or inquiry. The initial contact at the government office might not be the correct person or perhaps the caller has reached the wrong department altogether. Using the network's call conferencing features, the government worker can make a second call to a second government worker. This second call might be transferred a few times, but once this second call is established with the desired party, the first worker can conference the second government worker, the outside caller, and himself together. This initial government contact person can explain in his or her own words the citizen's problem or inquiry to the second government worker, and this description can of course go both to the other worker as well as the outside caller. Once the first government worker has set up the conference call and smoothed the way by explaining any details to the second worker, the first worker can hang up and leave the call. The outside caller will then be talking to the person and/or department needed directly.

In one presently preferred embodiment, if a new user is brought into a call it will be possible to send over the entire record of the call up to that time. This is because the method of communication is based on textual character transmission. This updating can be made invisible to the new participant. The new user can then "scroll back" on the new user's computer screen to see what was said before the new user joined the call, or the new user can otherwise view the entire text of the conversation from the beginning of the call. Of course, earlier call participants can "copy/paste" text or otherwise send over selected text blocks from earlier in the call, but the network communication system 10 can include a button or menu selection which will create the same "history" for new call participants as is present on the systems of the earliest, participants in a convenient way. This "call history updating" can be made automatic for any new user, or, it can be made a feature available to present users but which takes a deliberate action by the earlier users. This latter approach has the advantage in that call users may not want a newcomer to the call to see everything that was said before. In fact, in one embodiment each user might have to deliberately update a new user with prior text from the user's computer or TDD. In other words, if Sally, Fred, and John are in a conference call, and Sam joins the call later, then Sally might update Sam's session with her earlier text, but Fred and John might not. So, Sam would in this case have an incomplete record of the call before he joined in. This technique can lead to a confusing call view or history since some text will be missing.

Another approach in this regard is to follow the "veto method." Perhaps text is sent to each participant which says "The new participant *Sam* will receive a complete record of the call up to this time unless you veto this event within the next 10, 9, 8, 7, 6 . . . [etc.] seconds." This would give users an opportunity to veto the entire update to Sam, or perhaps to withhold only their own text from this update operation. The newcomer to the call could be prevented from knowing who vetoed the update if this occurs.

There will be at least four views available for conversations. Those views are: (1) full screen, (2) vertical split screen, (3) horizontal split screen, and (4) chat room full screen. Full screen is normally used only if there are two participants on a call. Each person waits for the other person to finish typing and then types. See the chat room full screen for a variation of a full screen display. In full screen there is no necessity to put a user's name or identifier in front of text from the user since the conversation is between just two users.

Vertical split screen can be used with 2, 3, 4, up to perhaps 8 or 12 participants on the call. The upper limit of participants is determined by the screen size of the display and the minimum width of each vertical window deemed acceptable by the user. The vertical axis of the screen is the time base of the call so that the order of query/response is preserved for later viewing or printing. It is noted that the number of participants will determine the number of windows needed in vertical, or horizontal, split screen mode. The software will normally automatically keep all participants with the same number of windows in either mode. So, if a new participant joins the conversation then all participants on the conference call will automatically see a new window appear for this new user. In a similar way, if there are only two users on a call, and one user flips between full screen view and vertical split screen or horizontal split screen view, then the party's screen on the remote side will automatically split/unsplit to keep the two sides with compatible views. It is not desirable that one user in a conversation use a view that is in some sense incompatible with the view used by other user(s) on the call. For example, one user using full screen and the other user using vertical or horizontal split view is not compatible since the user using split view may decide to type at the same time as the remote party. Since the full screen view is not compatible with simultaneous typing this would create problems for the user using the full screen view and should not be allowed by the software.

It is desirable that the software employ a hidden signaling system to keep the views of all call participants in a compatible format. One implementation of such a hidden signaling system would be a packet system or control characters which govern screen operation but which do not show up on the conversation screen as text characters.

Horizontal split screen is similar to the vertical split screen described above, but uses a separate horizontal window or pane for each participant. The advantage is that each window shows longer lines of text. The disadvantage is the time base of the conversation is not apparent. A desirable feature of the software is that the time base of the conversation is preserved in the log or capture file for the conversation, so that the user may flip between compatible views at will. Flipping back to a vertical split screen view should show the time base of the conversation again so that the query/response nature of the call is preserved, and any comments like "good" or "I like that" line up with the text which elicited the comment.

One variation on the above system for vertical or horizontal split screens could create active windows only for participants who are actively typing. Suppose there are 20 or more call participants, but only two or a few normally type at once. A horizontal or vertical window could appear on the screen of all call participants for someone who begins to type. In one variation of this concept, all call participants have a narrow window which expands larger on all participant's screens if that participant begins to type. The software could dynamically size the windows so that if one user only is typing the window for this user is quite large on all screens. If a second user also types, then this first window will narrow somewhat to accommodate the second user's window, and so on. In yet another variation, all call participants could be represented with an icon in an icon area on the display screen, and a conversation area is created on the display of all call participants in which text windows appear. If one call participant begins to type, then a text window is created in the conversation area for this user. This user's icon and/or name may appear with this window to make it clear who is typing. The windows for actively typing call participants can be horizontal or vertical in nature. Of course, the vertical format can preserve the time base of the discussion as previously discussed. The active participants who are typing and have windows in the common conversation area may show differences in their icon in the icon area, so for instance, the icons for the active users might change color, flash, or etc. so all participants can see who are the active users. A participant can leave the active typing area and shut down the window manually through a selection in the software, or, if the user is inactive for a certain period the software can shut down this window on a time out basis. Each call participant may be able to select a user's icon and request further information on this participant, such as their picture or image, department, email address, phone number, and so on.

Chat room full screen is similar to that used in Internet Relay Chat (IRC) systems. A participant to the conversation types text and hits the return key or otherwise selects "send." This text is sent in a burst or a packet and shows up in the display window of all call participants prefaced with the sender's name for identification. This is different from the first three methods described above in that the preferred implementation of the above methods will display each text character as it is typed by each participant, and text is not sent as a burst or packet at the time selected by the participant.

In one presently preferred embodiment, a user can flip among the four views above at will in the middle of a conversation, and each participant can choose a particular view independently of the other participants. In practice this freedom is difficult to accomplish since the "ground rules" are different in certain views. Vertical and horizontal split screen formats are compatible and can be flipped from one to the other at will. Full screen can be flipped to the other described views easily. However, if two users are typing at the same time in vertical or horizontal split screen then this would not translate well to full screen or chat room full screen.

It is possible to set up a conference call with a mix of participants using node software, modem software, standard modem software, TDDs, and even standard communications software such as Procomm. If one participant is using a TDD then this introduces certain limitations. For example, suppose a TDD is in connection with modem 12 on the network communication system 10 and is a participant in a conference call. If the TDD user types, then this text can be sent to the appropriate window or pane of each of the other conference participants as it is received by network communication system 10. If another participant types, then this text can be sent to the screen of the TDD. The text sent to the TDD should be prefaced with a name of the person typing or other identifier so the TDD user can easily see who is typing. Problems can arise if large amounts of text are being sent in the conference call. The TDD participant can fall behind the call since the 45 or 50 bps speed of a TDD is quite slow. Another problem arises if two or more conference call participants type at the same time. In such a case a preferred embodiment will feed text to the screen of the TDD from one participant and after a time change to the text of the other participant, with an appropriate ID string preface so the TDD user can see who is typing. In other words, the network communication system 10 might send:

Bill: OK, that is fine

Frank: I'll be there

Periodically the network communication system 10 should insert pauses in the text flow to the TDD so the TDD user can begin typing again, even if there is pending text to be sent to the TDD. This will prevent the TDD participant from being locked out of being able to type.

It is certainly possible that in a conference call with one or several fast typists that the TDD participant can fall behind and be reading text that was typed some time in the past. In one embodiment, a moving highlight is displayed on the screen of the high speed node or remote modem participants so that these users can see where the TDD user's screen is presently located. In a vertical split screen or chat room view the other participants could see a moving highlight block on screen showing the present update point of the TDD participant, and the vertical axis time base of the view would show how far behind the TDD user is. If there are more than one TDD participants, the TDD's might be updated at different rates so two colors could be used on the highlight blocks of the node and remote modem screens to show the status of each TDD screen separately.

3. Messaging

A remote text user using a remote device can call into the network communication system 10 and receive automated services as described above. One of the important services offered by the network communication system 10 is the ability for the text caller to leave a text message. As previously discussed, node users may register with the network communication system 10 and record their name, department, and so on. The registration form may also request information as to the preferred method(s) to deliver or forward text messages to the user. Methods may include conventional email, fax, direct delivery to the node software, delivery to an alpha pager, voice mail delivery using text-to-speech, and so on. This information in the network database makes it easier to deliver messages to registered users, since the remote text user may only need the name of the person or department and not an email address, fax number, or etc.

Every registered node user may have a mailbox. If an remote text user tries to call a node user or department over the network, and this attempt is not successful, then the remote text user will get a "text mailbox" in which to leave a message. The user or department can customize the mailbox greeting which is sent to the remote text user. This mailbox greeting is stored on the network communication system 10 and does not depend on a node computer being on. So, the node software should have a means to view and change the central mailbox greeting for that node user. The node software may also provide means to view mailbox messages for that node user, however, if the preferred mailbox delivery method is email, fax, etc. then this provision may not be needed. A remote user connecting to the network communication system 10 may elect to go directly to the mailbox service and not attempt a real time chat session with a node or department.

There are several issues to consider in the field of messaging. These include methods of network mailbox text delivery, methods to notify a node user or department that a text message has been received, methods to notify a node user or department of a pending text telephone call, methods of responding to the text message(s), and methods to deal with voice messages left for deaf users.

a) Methods of Delivering Text Messages from a Text User

As mentioned above, text messages left by a text user can be delivered by a conventional email account, by fax, by an alpha pager, by direct delivery to the node software, and/or to a voice mail account using text-to-speech techniques where the text message is "voiced" by the network communication system 10 into a voice recording system. In this last method, the network communication system 10 can call to the phone number or extension of the destination user and "text-to-speech" send the text message as a voice call to the destination user's voice mail. When a user registers with the network communication system 10 then the user's preferred text delivery methods may be chosen, along with appropriate information such as an email address, fax or pager number, voice mail account, and so on.

b) Methods to Notify a User or Department of a New or Pending Text Message

If a text message is left by a remote TDD or remote modem user, then the node user or department may need notification of this event. In this regard, integration of the text messages with a voice mail system can prove useful. If a voice message is pending then some voice mail products will light an indicator on the phone set, place a stutter on the dial tone when the handset is raised, or use other techniques to alert the user that a voice message has been received. Of course, if the original message had been left as text, and the network communication system 10 had voiced this message using text-to-speech techniques into a voice mail account, then these "voice message pending" alert techniques are perfectly appropriate for this case. It is noted that these message notification techniques can be activated for text messages as well. As one example, if a text message has been received for a particular user, then the network communication system 10 could put a voice message in this user's voice mail telling them of this text message and possibly instructing them how to retrieve a pending text message. The conventional voice message notification system would then activate, and the user would then learn of the text message from the voice mail system.

Another possibility would be to activate a numeric or alpha pager to notify a user that a new text, or voice, message has been received. Still another possibility is to place a box or device on the serial or parallel port of a computer acting as a networked node and flash an indicator light, send text to a separate display, or cause sounds on the node device to alert a user that a new text or voice message has been received. Of course, direct interaction with a user's node software is possible and a computer screen could flash. Alternatively an on-screen icon could activate or the text of the message or message identifier could appear on the computer screen of the message recipient.

c) Methods to Notify a User or Department of a Pending Text Telephone Call

A remote text user may call into the network communication system 10 and request a call transfer to a certain node or department. Alternatively, a remote text user might be automatically transferred to a certain node or group of nodes. Techniques are needed to alert the node user(s) that an incoming text call is pending. One or more of these techniques involves the use of an audio or visual indicator to alert the node user of an incoming text call.

If a call from a voice caller is transferred within an organization, then there are well developed and familiar techniques to alert the person or department being called of the incoming call, for instance, a telephone can make an audible sound and "ring." Another technique is an audible page through the telephone set or through other speakers which can audibly inform a person they have an incoming call.

Some of the above methods can be adapted to alert a node user or department of an incoming text call. For example, the network communication system 10 could cause a general page on overhead speakers to inform a node user or department that an incoming text telephone is pending. Also, the network communication system 10 can cause the phone(s) of the destination node user or department to ring. Upon answering, the user will receive a voice recording informing them that an incoming text call is pending. This recording can offer the answering user a menu of choices which are activated either by voice or by DTMF tones on the phone keypad. Examples of menu choices are:

(1) Decline the call. In this case the network communication system 10 may inform the caller that the node user or department is not available and offer the caller a mailbox or messaging option.
 (2) Will accept the call. In this case the network communication system 10 can inform the caller to please hold and the called party will come on shortly.
 (3) Ask the network communication system 10 for further information. This might include information on the mechanics of how to accept a text telephone call, or the user could ask the network communication system 10 to provide the name of the calling party. In this latter case the network communication system 10 can use text-to-speech to speak the caller's name, if known.

The network communication system 10 may ask all callers to provide their name, or name information could be available from caller ID or automatic number identification signals from the PSTN.

Another technique to alert users that an incoming text call is pending is to send a message to a numeric or alpha pager. This method is particularly appealing for deaf users since a vibrating pager can be felt by a deaf user. The alpha or numeric message appearing on the pager can contain a code or text explaining the reason for the page.

Another technique to alert users involves a pop up ring box being displayed on a monitor or other output device on the node user's computer to alert a user that there is an incoming text call over the network communication system 10. This method will work if the node user is looking at the node computer screen or is close enough to hear an alert noise made from the node computer's speaker. If the node computer has a sound card or audio circuitry and larger speakers attached to the audio circuitry then a louder alert sound can be created to catch the node user's attention.

The pop up ring box may display information regarding the location and/or user of the remote device from which the text communication is originating. This allows a node user the advantage of identifying the source of the incoming text communication. The ring box also may display information regarding the nodes 48 participating in the text communication.

The technique mentioned above where a device is attached to the node computer's serial or parallel port can also be used to alert the node user of an incoming call. In this case, the node software running on the node computer can be activated by the incoming call, and cause the serial/parallel port device to flash a light, make a sound, or display text on a display.

Figure 3:
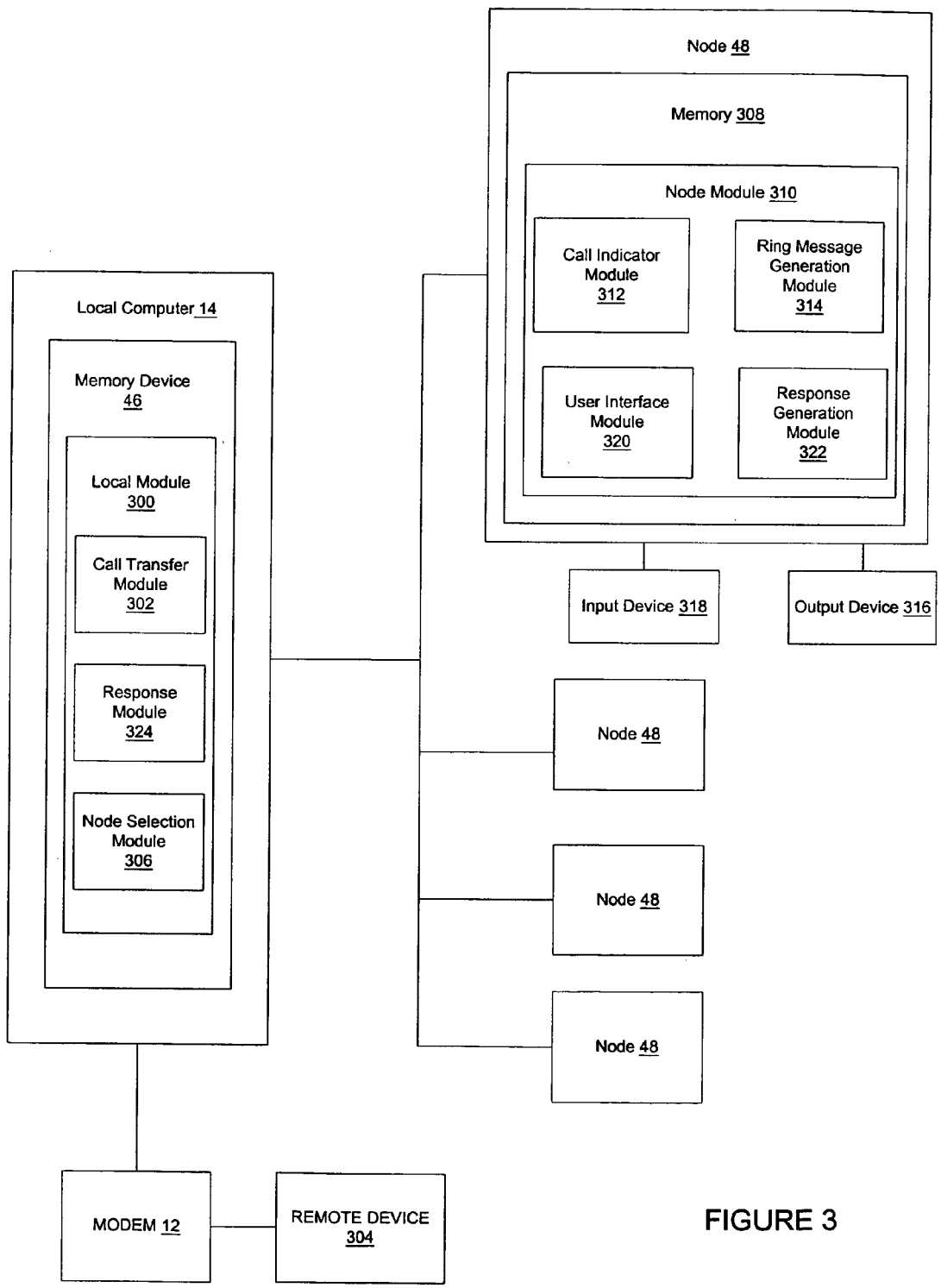
FIG. 3 is a block diagram of a portion of the communication system showing software modules for performing functions of the present invention.

Referring to FIG. 3, a block diagram of the network communication system 10 with expanded views of software modules on the local computer 14 and the node 48 are shown. As defined herein, software modules may be segments or blocks of codes that provide instruction steps in accordance with the present invention. The software modules may be entirely resident on a computer readable medium or dispersed throughout a plurality of computer readable mediums in the network communication system 10.

The local computer 14 may be any node 48 within the system 10 that has some processing capability. The local computer 14 includes a local module 300 that enables operation of the call transferring and may be resident in whole or in part on the memory device 46. The local module 300 may include a call transfer module 302 that is configured to convert a received call into call data suitable for transmission across the network communication system 10. As discussed above, a call may be received by the modem 12 from a remote device 304, such as a remote TDD 18, a remote ITU modem 20, or a remote telephone 24. The call may therefore consist of text or voice messages. Such messages must be converted into data compatible for network transmission. Throughout communication with the remote device 304 and the nodes 48, the local computer may maintain a carrier connection with the remote device in a manner previously described above.

The call transfer module 302 may be further configured to generate a call indicator upon receipt of an incoming call. The call indicator may be embodied as a data block that simply indicates an incoming call. The call indicator may be transmitted to certain nodes 48 within the system 10.

Selection of the nodes 48 to receive the call indicator may be performed in various ways. An incoming call may include a request to communicate with certain nodes. A request may indicate specific nodes 48 or nodes 48 in a predefined grouping such as a department. With predefined grouping, certain nodes 48 are previously grouped according to a commonality. For example, all members of marketing may be grouped together. An incoming call regarding a general marketing issue may be transmitted to each participating node 48 in the marketing group.

Alternatively, an incoming call may make a general request for communication. As such, the local computer or the local user may need to make a determination as to the appropriate node 48 or nodes 48 for communication. The local computer 14 or local user may then decide whether to transmit the call indicator to such nodes 48.

The call indicator may include information regarding the identity of the call. Identification data may be obtained through caller identification such as by means of ANSI methods. The local computer 14 or local user may also prompt the remote device 304 for identification data. Thus, the remote device 304 may be prompted for a name, geographical origination of the call, nature of the call, PIN, account number, or other additional information. Upon satisfactorily replying with identification data, the local computer 14 may then generate the call indicator and include the identification data.

The local computer 14 transmits the call indicator to one or more of the nodes 48 with whom communication is requested. The nodes 48 may each include a memory 308 to allow storage of a node module 310 in whole or in part on each node 48. A node module 308 may comprise a conventional browser to allow for interfacing with the world wide web. The node module 308 may further include a call indicator module 312 that is configured to recognize receipt of a call indicator from the local computer 14. In response to the call indicator module 312, a ring message generation module 314 generates a ring message.

The ring message may be embodied as a visual indicator of a call, such as a pop up window. As such, the ring message may be an icon, graphic, or GUI that is displayable on an output device 316 in electrical communication with the node 48. The output device 316 may be embodied as a conventional monitor or other display device. The ring message may be visually stimulating to provide urgent notification of an incoming call. The ring message may also be embodied as an audible indicator that is played on an output device. As such, the output device 316 may be embodied as speaker or other audio device.

The ring message 316 may display or otherwise convey identification data to identify the call. The identification data may assist a node user in deciding whether or not to accept the call. The ring message 316 further prompts the node user as to whether or not to accept the call. If a node user does not respond to the ring message, the ring message may terminate after a certain span of time.

A node user may respond to the ring message by inputting a response into an input device 318 in communication with the node 48. Such an input device 318 may be embodied as a mouse, keyboard, voice activation device, and so forth. An inputted response is reviewed by a user interface module 320 that interprets the response. The response may accept or decline the call. Alternatively, the response may request additional identification data from the remote device 304.

A response generation module 322 generates response data that represents the node user response. The response data is then transmitted across the system 10 to the local computer 14. A response module 324 reviews the response data to identify and interpret a node user's response.

If the response is to accept the call, then the call transfer module 302 commences to transmit call data to the accepting node 48. The accepting node 48 may in turn respond with call data to enable communication between the node 48 and the remote device 304. The call transfer module 302 may be required to convert call data from a network format to a format suitable for communication over a PSTN, and back again. Real time communication between the local device 14 and the accepting node 48 is thereby enabled.

If the response is to decline the call, then the call transfer module 302 does not initiate communication with the declining node 48. The call transfer module 302 may instead prompt for a voice or text message to be deposited in a mailbox associated with the node 48.

If the response is to request additional identification data, then the call transfer module 302 may generate a request to the remote device 304 for additional identification data. The remote device 304 may supply the additional identification data which may then be transmitted to the requesting node 48 in a subsequent call indicator.

Rather than originating on a remote device 304, the call may also originate and terminate with the network communication system 10. As such, the place of origination may be termed the local computer 14 and any node 48 that originates a call may be so termed. The network communication system 10 may be further embodied as a LAN, WAN, or global computer network such as the Internet. As the advantages of networking creates ever growing expansions of such systems, modems may see limited use. One of skill in the art will appreciate that call notification has application within such network systems.

A call indicator may be transmitted to a plurality of nodes 48 to give each the option of accepting or declining the call. Nodes 48 in a group or department may therefore be alerted simultaneously to the call. Acceptance of the call by one node 48 may result in termination of the ring message for the other nodes 48. Thus, the first node 48 to accept the call may prevent the option for other nodes 48.

Alternatively, acceptance of the call by the accepting node 48 may result in the generation of a revised ring message for the other nodes 48. The revised ring message may allow other nodes 48 the option to join into an already ongoing communication.

During a communication, a participating node 48 may desire to transfer the call to one or more other node 48. Alternatively, the participating node 48 may desire to prompt another node 48 to participate in the communication. The participating node 48 may generate a call indicator and transmit the call indicator to one or more other nodes 48. Responsive to the call indicator, a receiving node 48 may generate a ring message. Similar to the method described above, the ring message may prompt the non-participating node as to whether or not to join in the communication.

The call data may contain text data, voice data, or ITU data. The methods of call transferring and notification are particularly applicable to communication comprising text data. As text data, the communication between nodes and/or a remote device may include full screen, vertical split screens, chat communication, or other techniques described herein.

Figure 4:
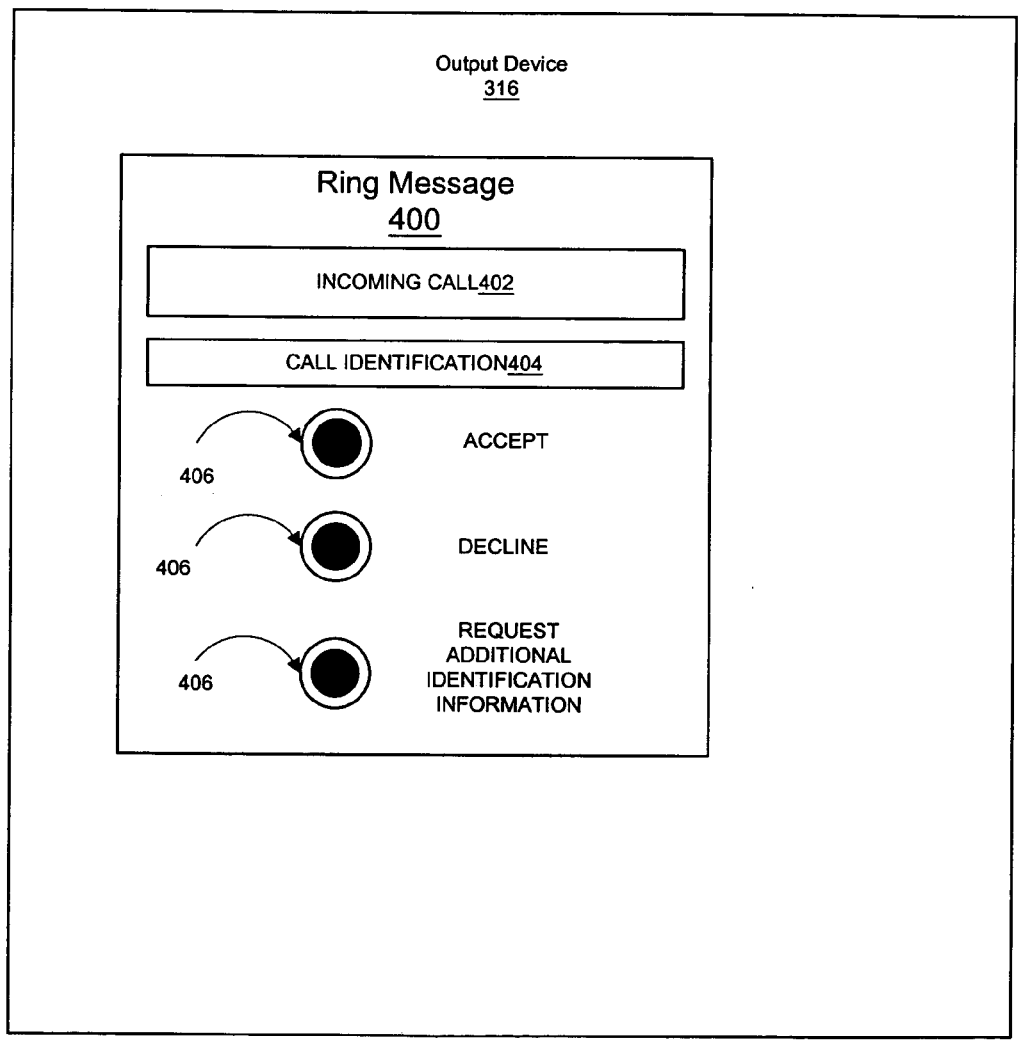
FIG. 4 is a block diagram of one embodiment of a display for use in accordance with the present invention.

Referring to FIG. 4, one embodiment of a ring message 400 that is displayable on an output device 316. One of skill in the art will appreciate that the ring message 400 may vary in configuration, shape, size, color and so forth. The ring message 400 may include an audible indicator such as a ring tone to alert a node user.

The ring message 400 may be embodied as a GUI and allows a user to respond to the message. The ring message 400 may include an incoming call display 402 to alert the node user to the call. The incoming call display 402 may include text, graphic, icon or other visual display. Such visual displays are obviously quite useful to the deaf. The incoming call display 402 may include flashing lights to further draw attention to the call. The ring message 400 may further include a call identification display 404 to provide identification data about the call. The ring message 400 may further include toggle inputs 406 that allow a node user to accept, decline, or request additional identification information. Enabling an appropriate toggle input 406 provides the corresponding response.

In one embodiment, enabling a request for additional identification information may cause the user interface module 320 to prompt the node user for a query. The node user may then enter a specific query for the additional identification information. The query may then be compiled into response data by the response generation module 322 and transmitted to the origination of the call.

The present invention simultaneously notifies a plurality of nodes to an incoming call. Each node then has the option of accepting or declining the incoming call. Upon receiving an acceptance, the call may then be transferred to the accepting node. Real time communication is thereby enabled between a local computer 14 and a node 48. In one embodiment, the communication may consist of text exchanges that may be formatted in various configurations based on system design or user preferences.

d) Methods of Responding to a Text Message

The network communication system 10 can ask a text caller what the preferred response method should be to allow the message recipient to respond to the message left by the text caller. So, the text caller might request a fax back to a fax number, an automated call back to a TDD or modem number with the response text, a page to an alpha pager, a reply to an email address, or, the network communication system 10 can provide a message code and/or password to the text caller so that the text caller can call back at a later time and receive a response to the message if available.

A particularly convenient method of responding to a text caller when the text message is forwarded to an email account is to simply respond as if the message was a conventional email. In such a case the message recipient would just select "reply" in their email software, type the response, and select "send" or "ok."

The node user may also be alerted by a pop up ring box which may indicate the node user(s) to which the text call was directed. The ring box may require that the node user respond to the text call. The ring box may only require some acknowledgment from the node user and not necessarily a drafted response to the text caller. Thus, the node user may postpone a response by merely clicking a dismissal on the ring box.

The ring box may prompt for an inquiry from the node user. For example, the node user may respond with an inquiry as to who the remote user is, the nature of the communication, and so forth. This inquiry may then be sent to the remote device for the remote user to respond. The remote user's response is then transmitted to the node user. The node user can then decide whether to proceed with textual communication based on the node user response.

Alternatively, the ring box may merely inform the node user that a text call is received and no further action need be taken. This allows a node user to ignore ill timed intrusions. The ring box allows a user to screen incoming calls as desired.

The email return address is the address of the network communication system 10 itself, so the email response will come back to the server 54. Now, the network communication system 10 can consult the text caller's selected response method, and send the response to the caller via a TDD or modem callback or any of the other response methods discussed above. The node software can offer a similar feature for messages received from text callers, so that mailbox messages include a "reply" option to simply type a text reply, click "ok," and send the text reply back to the network communication system 10 for delivery to the TDD or modem text caller.

If the TDD or modem caller leaves a text message that is delivered to a hearing user's voice mail account via text-to-speech, then several methods exist to let the voice mail user respond to this message. The network communication system 10 could include voice instructions to the hearing user within the voice message as to a phone number which can be called and in which a voice response can be delivered. A DTMF or voice code might be provided to this user to signal this voice mail account as to the particular message being responded to. As another option, depending on the flexibility of the voice mail system, the system could ask the voice mail user whether the user wishes to record a voice response at the time of the initial message playback and accept the voice response immediately after the playback of the TDD or modem caller's message.

Once a voice response is recorded, the problem becomes how to deliver this response back to the TDD or modem text caller. This problem occurs also when a voice message is left in the voice mail account of a deaf user. Solutions to this problem are discussed in the section below.

4. Methods to Mangage Voice Messages Left for Deaf Persons

Voice mail is widely used, and provides a convenient method for speaking users to leave a voice message for users or departments. Unfortunately, the recipient of the voice mail message might be deaf. The problem then becomes how to translate the voice message into text for the deaf user.

A technique in this regard is computerized voice-to-text translation (speech recognition). However, acceptable speech recognition engines fail to recognize accented, slurred, non-standard, or even conversational speech.

In one presently preferred embodiment a relay service staffed by human operators will be employed by the automated network communication system 10 to translate the voice into text and allow the delivery of the text to the deaf user as any other text message. This technique should not require human intervention except for the services of the relay operator. The relay operator could be a site maintained by a telephone company (telco), or, the relay itself could be privately maintained within the organization or by another organization.

There are several issues raised in this regard such as how to "play" the voice message to the relay operator. This includes provision for operator control of the audio recording such as pause, rewind, forward, and stop of the audio playback by the relay operator so as to make the voice to text translation more convenient. Another issue is the nature of the PSTN connection from the network communication system 10 to the relay service, such as a DSVD link, "2-line VCO" where the voice recording is on one PSTN line while the data connection needed for the operator typed text is on another PSTN line, or a carrierless protocol such as TDD Baudot which can allow data and voice on the same PSTN line.

In one implementation the network communication system 10 will get the voice message left by the voice caller converted to an audio file such as, for example, a "WAV" file. Once this step is accomplished then the network communication system 10 can call the relay service and provide pause, rewind, etc. control of the audio playback to the operator. In one implementation, the relay operator can send DTMF phone keypad "touch tones" to control the audio playback. These DTMF touch tones could be sent by pressing keys on a phone or by other means. So, for example, a DTMF "one" might mean to stop the audio recording so the operator can catch up with the typing of the voice recording. A DTMF "two" could be the "play" signal and would start the recording again. "Three" could be rewind. "Four" could be fast rewind and "five" could be forward. "Six" could be fast forward. The network communication system 10 can play an audio recording describing these choices for the relay operator.

There are other techniques possible here. The software on the relay operator's computer could send data characters instead of DTMF tones to accomplish the "play," "stop," "rewind," etc. functions described above to control the audio playback of the voice message. The network communication system 10 can send a menu of these commands to the operator at the beginning of the call. Since the modem connection from the network communication system 10 to the relay operator supports data flowing in both directions, the relay operator could send, for example, a "p" for "play," a "s" for "stop," and so on. System level commands can also be implemented, such as a "h" command to hang up the call when finished, a "n" command to advance to the next voice message if any, and so forth.

There are several techniques to convert the audio voice mail recording to an available to the network communication system 10 so that the network communication system 10 can play this audio recording to a relay operator. In a simple implementation, the network communication system 10 can call into the voice mail system and check for voice mail messages for any deaf person on its database listing. This call-in could be due to a notification event that a voice message is pending, or, could be periodic at certain time intervals. If a voice message is pending for a deaf user, the network communication system 10 can activate the audio playback of this message using conventional techniques for "remote" retrieval of voice messages. Most voice mail systems allow a user to call in and activate a playback of voice messages. Such retrieval is often password or DTMF code protected so the network communication system 10 database will need the password or DTIAF code for the deaf user. The network communication system 10 will call the voice mail system using its modem 12 which is embodied as a modem capable of voice recording and playback. The modem 12 can then digitize into an audio file the audio sounds of the voice message as it is played back by the voice mail system.

Of course, the voice mail system could directly provide an audio file to the network communication system 10. Voice mail systems usually digitize the voice messages into audio files anyway, so the problem is then simply to retrieve the audio file from the voice mail system into the network communication system 10, or otherwise permit the network communication system 10 access to the needed audio file(s). These audio files can then be played to the relay operator for transcription to text.

Another issue is the nature of the connection from the network communication system 10 to the relay operator. If the network communication system 10 calls out to the relay service over the PSTN, then a standard data connection (such as a V.32 or V.34) presents problems. Such modem data connections do not allow a simple audio playback of a voice recording since the modem carrier is present. It is possible to send digitized audio on this data connection, but this would require compatible software on the relay operator's computer.

A solution for PSTN connections is to establish a SVD (simultaneous voice and data) modem connection between the network communication system 10 and the relay operator. Several SVD standards have been promulgated, some of which have, been ratified by the ITU. An example of one SVD standard is "V.70". The "Voice View" SVD method by Radish Technology is another approach which permits analog voice sounds to co-exist with a data modem connection. Using SVD techniques, the audio playback of the voice message can be played to the relay operator, and the relay operator can type back the transcribed text on the data link back to the network communication system 10. Of course, this method required that the relay service support SVD modem connections.

Another solution for the network communication system 10 to relay service PSTN connection is a "2-line VCO" technique. This technique is used by some relay services to allow a deaf but speaking user, using two PSTN lines, to talk and receive text simultaneously. The voice sounds are sent on one PSTN connection and the typed characters back to the deaf individual are sent on the second PSTN line. A similar technique can be used by the network communication system 10 to get a voice recording transcribed to text by a relay operator. The network communication system 10 can establish two PSTN connections to the relay service. The audio recording of the voice message can be played to the relay operator on one PSTN line while the operator types the transcribed text back to the network communication system 10 on the second PSTN line. The second PSTN connection can be any carrier based or non-carrier based data connection, such as TDD Baudot, V.32, V.34, and so on. The relay operator can control the playback of the audio recording using the techniques described above. DTMF tones used to control the playback can be sent on the voice PSTN line, or the data line if the data connection is non-carrier based. Typed characters can also be used on the data PSTN line to control the audio playback. These characters must be distinguished from the transcribed text, so control characters, non-printing characters, "upper block" (above 128 decimal) characters, data packets preceded by the above, and so on may be used for the audio playback control which can be distinguished from the text of the audio file transcription.

A third technique for the PSTN connection from the network communication system 10 to the relay service is a non-carrier based connection such as TDD Baudot. TDD tones, and voice, can co-exist on the same PSTN line as long as both are not present at the same time. Using a single PSTN line and a TDD Baudot connection the relay operator would have to play some section of the audio recording, signal for the recording to pause using a DTMF tone or other technique, type back the text transcription of this audio fragment, and then resume the audio playback to the next fragment, again using a DTMF tone or other technique.

A fourth possibility is to play the audio recording in its entirety to the relay operator. The relay operator could record these voice files locally in the relay service. This recording could then be played back, transcribed to text, and the text sent to the network communication system 10 on the same call or a different call.

5. Hearing/Speaking Persons Calling Deaf and/or Speech Impaired Persons

Telephone companies in the U.S. maintain relay services in which operators, or automated equipment, mediate phone calls. For instance, if a hearing/speaking person wishes to talk to a deaf/speech impaired person, the relay operator will listen to the speaking person and type the words to the deaf person's TDD or modem. If the speech impaired person types back, the relay operator voices this text to the hearing party.

It should be noted that many deaf persons can speak, and many speech impaired persons can hear. Accordingly, the relay services have developed techniques for these cases. In the technique called "VCO" or "voice carry over," a deaf but speaking person can speak during a relay call, and the sounds of his or her voice are "bridged" over to the phone line of the remote hearing party he or she is communicating with. The voice of this remote party is turned into text by the relay operator as needed.

Similarly, a hearing but speech impaired person, in a "HCO" or "hearing carry over" relay call will be able to hear the voice of the remote party since the voice sounds of the remote speaking party are bridged over to the phone line of the speech impaired party by the relay service. The speech impaired person will, in the traditional art, type back to the relay operator who will then voice this text to the remote party. These techniques are well known in relay service art.

In the most common technique, there is only one PSTN connection from the deaf and/or speech impaired person to the relay service. In this case there are both voice sounds, and modem data, existing on the same phone line during the call. In the usual technique, a TDD Baudot modem is used. Since TDD Baudot modems do not have a modem carrier, voice sounds and the FSK modulation sounds of the TDD can both exist on the same phone line, but there are severe difficulties in putting simultaneous voice sounds and TDD tones on the phone line at the same time. Any person listening to voice sounds in such a case will also hear the TDD tones, unless special filtering techniques are used.

Traditional modem protocols, such as Bell 103, V.32, etc. cannot easily be used for VCO or HCO calls since these modem protocols use a constant modem carrier. Anyone listening in on the phone line, if one of these protocols is used, will hear the constant sounds of this modem carrier and will have a difficult time hearing voice sounds on the line.

a) VCO/HCO with SVD Modems

One innovation which can be made for VCO or HCO calls is to use an "SVD" modem protocol, such as V.70. SVD, or "simultaneous voice and data" modems. These modems offer a distinct advantage over the TDD Baudot modems. A SVD modem can allow simultaneous communications so that voice sounds and modem data can exist on a PSTN line at the same time. In a VCO call for instance, while a deaf but speaking user is talking, text can appear on the user's display saying "wait a minute, you misunderstood me." The remote party in this case voiced this comment to the relay operator who then typed it to the deaf person's screen. In a HCO call a speech impaired but hearing person can type something back to the remote party while the remote party is still speaking. The relay operator can the voice this text to the remote party even though this remote party is still speaking.

b) New Techniques for Hearing/Speaking Persons to Call Deaf and/or Speech Impaired Persons Suppose a hearing/speaking ("H/S") person wants to call a deaf person via telephone. The H/S person may not know that the person he is calling is deaf and might then call the deaf person's phone or phone extension directly. The H/S person may not be familiar with a relay service, and may find it confusing, intimidating, or just too much work to learn how to use a relay service. There is also the problem that once the H/S person has called a deaf person's phone or phone extension, the deaf person's answering system must somehow detect that the caller is a voice caller and provide instructions to the H/S person how to call the relay service and request that an operator dial the deaf person's phone again. This is an inconvenient procedure. In a larger organization, a H/S person may wish to speak to the director of a certain department, who may be deaf or speech impaired. If this call is transferred directly to this director then the two parties cannot easily converse. It might also be noted that a deaf business man might feel he needs to hand out a business card with his phone number, the phone number of a relay service, and instructions on how to use a relay service. This needlessly complicates business, as well as social, relationships.

An object of the invention is to allow a hearing/speaking person to call the phone number of a deaf and/or speech impaired person directly. A second objective of the invention is to allow the H/S person to talk and the deaf and/or speech impaired person type at the same time and so enjoy "full duplex" conversations. A third object of the invention is to permit H/S persons, text telephone callers using a TDD or modem, as well as fax calls to all call in on the same phone line using the same phone number.

In the present invention the deaf and/or speech impaired person will have two communication links such as two phone lines or access to two phone extensions. If the relay service available supports LAN, WAN, or Internet communications, then one or both of these two communications links could use this type of link. These phone lines, phone extensions, or LAN/WAN links can be analog POTS lines, digital lines such as ISDN or DSL, or etc. One communication link, at least, should be capable of supporting simultaneous voice and data communications ("SVD"), such as by using an SVD modem on a POTS line, by using two channels of an ISDN line with a data modem on one channel, or similar method on a WAN. Other SVD methods will be apparent. For purposes of explanation, the communication link capable of SVD will be named "Line B," and the other link "Line A." Line A will be the communication link on which the H/S person initially calls the deaf and/or speech impaired person.

When an incoming call is received by Line A, the deaf and/or speech impaired person may decide that this line will handle one or several types of calls such as voice calls, data (text telephone) calls from TDDs or modems, or fax calls. If the deaf person wishes to support more than one type of incoming call on Line A, then some type of call discrimination is needed. Fax calls are usually easy to discriminate since most faxes support a "calling tone" that can be detected by the answering device. Unfortunately, voice callers will typically not put any sounds on the line the answering system can detect, nor do many data modems or TDDs. Accordingly, some active interrogation is often needed to discriminate between data calls and voice calls.

If the deaf and/or speech impaired person wishes to support both data calls and voice calls on Line A, then in one configuration the call can be answered as follows. The answering device on Line A goes "off hook" and answers the call. A fax calling tone detector is activated and accepts a call from a fax if these tones are detected any time in the following procedures. The answering device may then place a recorded voice on the line asking a voice caller to make some response which can be detected. For instance, the answering device could ask the voice caller to say a word such as "voice" and then listen for this voice response. Or, the answering device could ask the voice caller to press a button on the voice caller's touch tone phone keypad and then listen for a DTMF tone response. If a suitable voice, DTMF, or etc. response is elicited then the answering device will proceed to handle the voice call. If no response is elicited from a voice caller, then the answering system may then decide to try and elicit a response from a calling standard modem or TDD by emitting the appropriate tones.

If a response was elicited from a voice caller, the deaf and/or speech impaired person could not talk or listen directly with this voice caller. If the call was answered under automated control, the answering system may verify that the deaf and/or speech impaired person is present and available to take the call, and the answering system can call out to a relay service on the second Line B. The answering system may provide a "please wait" message to the voice caller on Line A. In one presently preferred embodiment, the answering device will set up a SVD link with the relay service on Line B. The voice caller will now be informed that the call can proceed.

In one presently preferred embodiment, voice sounds from the voice caller on Line A are sent over to the Line B SVD line and can be heard by the relay operator. The operator can translate these voice sounds into text and type back, simultaneously while hearing these voice sounds, on the Line B link causing this text to appear on the screen of the answering system device of the deaf user. If the deaf user is speech impaired, the user may type responses back to the relay operator who will then voice this text. The voice sounds of the relay operator will travel on the SVD link on Line B to the answering system and pass over to the Line A and so be heard by the voice caller on Line A. In one presently preferred embodiment the relay operator and the user will maintain split screen chat screens so that both may type at the same time. In this case, the conversation between all three parties is "full duplex." The voice caller and the relay operator can hear each other and may each talk to each other simultaneously at any time. The relay operator and the answering system user may both type at the same time if split screen chat windows are used. The voice caller and the user of the answering system may both talk or type at the same time to comment or interrupt each other.

The link from the answering system to the relay operator could be a non-SVD link using a carrierless protocol such as TDD Baudot. This configuration would not permit full duplex simultaneous typing between the relay operator and the answering system user, nor would it allow full duplex simultaneous talking/typing between the voice caller and the answering system user. In this configuration, if the voice caller is talking then the answering system will pass these voice sounds over to the Line B which will then be heard by the relay operator. Once the voice caller stops talking then the relay operator will be able to type the translated text to the answering system user. Similarly, if the user is typing TDD Baudot to the relay operator then the operator will receive this text, but will not be able to voice the text to the voice caller until the user stops typing. This second configuration is less desirable than the SVD configuration described above, but may be used if the relay service does not support SVD communications.

Implementation of the above invention can be accomplished with custom hardware using analog multiplexors to bridge voice sounds from one phone line to the other. However, in one presently preferred embodiment the invention comprises two voice capable SVD modems which are commercially available.

Most modern SVD modems support voice recording and playback. In the recording process, the sounds of a voice can be digitized into a digital file or a digital stream. This digital file or stream may be "played back" to produce the original voice sounds, perhaps with some degradation in quality. This playback can occur on the same modem, another modem, or a "sound card." Many SVD modems support "digital simultaneous voice and data" (DSVD) standards like the ITU's V.70 protocol where the voice sounds are sent as digital data over the V.70 link and reconstructed back into voice sounds on the receiving end. And, of course, these modern SVD modems support standard data modem protocols such as V.32bis or V.34.

In one implementation of the above invention, two SVD modems are attached to a personal computer, and no specialized hardware is required.

In the following example, the first configuration has been attained so that the first SVD modem is on Line A to the voice caller and the second SVD modem is on Line B to the relay service. The Line B link is a V.70 DSVD link or similar.

When the voice caller speaks, the Line A SVD modem digitizes the sounds of this voice and ships this digital stream over to the Line B SVD modem, either directly in a single modem enclosure, through a bus, serial, or parallel ports of a personal computer, or over a LAN/WAN as discussed below. The Line B SVD modem can format this digital stream into another format if needed, or may just pass the digitized voice sounds over the SVD link to the relay operator's SVD modem. The operator's SVD modem then does a digital-to-analog conversion and plays back these voice sounds to the earpiece of the operator. The operator then types the translated text on the SVD link to the screen of the answering system user. If the user types, this text is sent on the SVD link to the screen of the relay operator. The operator then voices this text. The sounds of the relay operator are digitized and sent on the SVD Line B to the user's second SVD modem on Line B. The Line B SVD modem then sends the digital data stream of these voice sounds over to the Line A SVD modem either directly, through the personal computer ports or bus, or through a LAN/WAN. The Line A SVD modem reformats the digital stream into the desired format, if needed, and does a digital-to-analog conversion of the data to produce the voice sounds of the relay operator. These voice sounds are "played" on to the Line A to be heard by the voice caller. In this implementation no custom hardware is needed to bridge the audio sounds from one phone line to the other on the user's device, and the techniques needed for this implementation should be clear to one skilled in the art of digitized audio, SVD modems, and audio streams.

It should be stressed that the above techniques can be employed in any system where there is a communication path between the Line A answering device and the Line B link to a relay operator so that digitized audio and data characters may flow as needed.

An important case would be the situation where the two modems described can communicate across a computer network (LAN, WAN, the Internet, etc.). So, for example, an organization with modems as described above (SVD, voice record/playback, and data capable) on a computer network could use these techniques so as to allow hearing/speaking persons to call a business phone number and converse with a deaf and/or speech impaired employee by linking a relay service into the call. As an example of this scenario, consider that a hearing/speaking (H/S) person calls into an organization and wishes to speak to the director of a department. It so happens that this director is deaf. Let us suppose that the phone connections at the organization are "sound boards" capable of digital audio, in other words, that the voice sounds of the caller can be digitized into an data stream. Further suppose that the phone connection device (sound board) processing this incoming call can "playback" a audio data stream and produce voice sounds for the caller. Suppose further that a SVD voice capable modem as described earlier is available and there is a communications link between this SVD modem and the sound board. This communications link can be over a LAN or WAN, or could be through a single computer which is directly linked to both the sound board and the SVD modem. Of course, the sound board and the SVD modem could be a single type of device in a single enclosure of system board.

Now, once the caller expresses a desire to converse with the deaf director of the department, the system will automatically call out on Line B to a relay service. This call could be made to an on-site "translator" person (relay operator) over the PBX or LAN/WAN, or could be to a relay service maintained by a telephone company. Again, the Line B call can be over a POTS line or via a LAN/WAN connection. Now, the data and digitized audio can be sent as described above so that the translator or relay operator can hear the sounds of the caller's voice and simultaneously transcribe the caller's words into text which is sent to the screen of the deaf director. If the deaf director can speak, these sounds are sent to the caller. If the deaf director types back, the translator or relay operator voices this text and these voice sounds are sent to the caller.

The advantages of the described techniques are several, and include the ability of a hearing/speaking person to directly call a deaf and/or speech impaired person. The Line B link to a translator or relay operator is then brought into employ to permit the desired communications.

c) New Techniques For VCO/HCO Across a LAN or WAN

A variation on the above concepts can be made as follows. Suppose Person A is deaf but can speak, and Person B is a hearing/speaking person ("H/S"). Person A may wish to voice to Person B and let Person B type back directly to Person A.

In Case (1), Persons A and B are both on a LAN or WAN and both have audio circuitry or sound cards (e.g., "Soundblaster" (TM) or compatible) with microphones and/or speakers. Person A voices into a microphones and sends the digitized audio across the LAN/WAN to the system of Person B. The sound card or audio circuitry of Person B plays this digitized audio data on the system speakers so Person B can hear the sounds of Person A's voice. If Person B types back, this text is sent as character data and is shown on the screen of Person A's computer via node software or similar software.

In Case (2), Person B is on the LAN/WAN as above described, but Person A, using a modem, has called into a modem in the network communication system 10. In a variation of Case (2), namely Case (2a), the modem used by Person A is a data modem using a modem protocol such as V.32, V.34, and so on. In this case, the deaf Person A may speak into the microphone of his or her sound card. The software on Person A's computer can take the digitized audio data from the audio circuitry of the sound card and pass this data via the modem connection to the modem 12 on the network communication system 10. The network communication system 10 will then pass this digital data to the node software on the hearing Person A's computer. Person A's audio circuitry system will play the sounds of the Person B's voice on the local speakers of Person A. If Person A types back to the deaf Person B, then these typed characters will be displayed on the computer screen of Person B.

In another variation of Case (2), namely Case (2b), Person A uses 4 SVD modem such as a V.70 SVD modem. In this case, the Person A may speak into a microphone attached to the modem itself, and the modem will digitize these voice sounds and send them to the SVD modem in connection with the network communication system 10. The network communication system 10 may reformat this digitized data as necessary for proper playback, and will then send the data on to the node software on Person B's system. Person B may type back, and these text characters are sent on the data link of the SVD modem connection and displayed on Person A's computer display. In another two variations of Case (2a), namely Cases (2c) and (2d), Person A and B switch roles so that the deaf but speaking Person B uses a modem while the speaking/hearing Person A is on the LANIWAN. In Case (2c) the Person B uses a data modem (V.34, etc.) while in Case (2d) the Person B uses a SVD modem. Otherwise, operation in these two latter cases is similar to the first two cases.

In Case (3a), both Person A and Person B use data modems (V.34, etc.) and the deaf but speaking person talks into a microphone attached to a sound card as in Case (2a). In Case (3b) both persons use a SVD modem, and the deaf but speaking Person A talks into a microphone attached to his or her local SVD modem, and these voice sounds are played on the headphones or speaker attached to the SVD modem of the hearing/speaking Person B. The typed characters from Person B are sent and displayed on the screen of Person A's computer system.

Extension of the above methods to "HCO" are apparent. If Person C is hearing but speech impaired, then the hearing/speaking person B will talk and these voice sounds will be played on the system of Person C. Person C can type back to the display of Person B in any of the Cases described above.

6. Calling a Modem with an Incompatible Communication Protocol

In many cases standard modems are not able to communicate with certain modems such as a TDD at 45 bps, a EDT text telephone, or etc. due to limitations in standard modem design. With the remote modem 20 embodied as a standard modem and connected to the network communication system 10, the standard modem software running on the remote computer 22 can cause the remote modem 20 to operate as a node 48. This will allow most or all of the screens and features supported by node software to also be supported on the remote computer 22. The packet protocol used with nodes 48 may, in this case, also be used for the node session on the outside of the network communication system 10. So, for instance, instead of getting text menus from the network communication system 10 like a TDD, a remote modem user running standard modem software could enjoy a more graphical interface. The remote modem user could see the network phone book, retrieve mail from network communication system 10 using the node software mail retrieval form, take part in multi-screen conference calls, support local/remote split screen activation, and so on. A particularly useful node function available to the remote modem user may be to call "outside" the network communication system 10 using a second TDD compatible modem to a TDD. By calling into one modem of the domain of the network communication system 10, and linking to a second TDD compatible modem in the domain, the standard remote modem 20 and standard modem software are able to call a non-compatible modem such as a TDD.

The technique just described could or course be offered to a user of any communication software and any modem. First, graphical screens and forms can be presented to other types of software which support a screen emulation standard such as ANSI, VT1OO, HTML, etc., so the node forms such as a network phone book, mail retrieval form, etc. can be presented. It is noted that "browser" technology also allows the sending of executable programs using "Java", "Active-X" and so on, so this affords an alternative method to get a "standard modem compatible" program on the computer of a user. Secondly, the network communication system 10 can offer the option of making a call through another modem within its domain to any caller. The key requirements here are that the network modem receiving the call from the caller must support a compatible modem protocol with the carrier's modem, and the second modem in the network domain calling out to another modem such as a TDD must share a common modem protocol with this TDD or other modem. The ability to link to a second modem in the network domain can be password protected so that only approved user's may exercise this option. Certain callers, or all callers, may be restricted in making expensive long distance PSTN calls. Of course, the ability of a person inside the network communication system 10 or outside to link to a network modem and make an outside local or long distance call can be protected with an independent password(s).

It is noted that the techniques described above also allow a TDD caller to call a modem which does not support the TDD modem protocol, such as most standard modems. The network communication system 10 can offer the option of calling outside the network to the TDD caller and to a second modem in the network domain. This second modem could then support modem protocol(s) compatible with the modem called. In general, a remote TDD user will also be able to call into the network communication system 10 and become a node user, just as a network caller. This privilege can be password protected. Once a remote TDD 18 becomes a node 48 then this caller can make an outside call as just described over a second network modem and thereby call a standard modem. Since TDDs and standard modems often do not communicate, this technique allows the TDD to originate the call.

The extension and use of these techniques to other types of modems which are incompatible is apparent. So, for instance, an "EDT" (European Deaf Telephone), or the DTMF based text telephones used in Europe, could send/receive calls from standard V.32 or etc. modems by linking to other modems on the network communication system 10. As long as one network modem is compatible with the EDT, DTMF, TTY, or etc. modem on the first modem link and a second network modem is compatible with the V.32 or etc. modem on the second modem link, then communications become possible between otherwise incompatible modems.

The two modems described above can of course reside in a single enclosure or system board, or reside within a single computer. In these cases, the presence of a LAN or WAN is not needed, nor is a network communication system 10 as described above. A single device supporting two communication links (POTS and/or LAN) can serve as a protocol converter and allow communications between two devices that do not share a common communication protocol.

7. Voice Modems Used as TDDs

Certain modems support digitized audio. These modems can sample the audio signal on the POTS line at sample rates such as 7200 Hz, 11000 Hz, and so. As long as the sample rate exceeds the Nyquist minimum for the upper TDD Baudot frequency of 1800 Hz. with a suitable antialiasing filter, along with other theoretical constraints such as the speed of filter response to a step change in signal, then a TDD Baudot receiver can be designed by processing the digitized audio signal with digital band pass filter algorithms and Baudot character recognition algorithms. On the transmission side, there are several possibilities, such as creating a distinct digitized audio segment for each of the 5 bit Baudot characters supported in the Baudot character set. Any of these audio segments can be sent to the modem to be played onto the POTS line.

Alternatively, digitized audio for each 1400/1800 Hz bit within a baudot character can be downloaded to the voice modem to be played, and thereby create a full Baudot character.

The above considerations apply as well to voice cards which do not support ITU or Bell data standards such as Bell 212, V.32, etc. Such cards are manufactured by companies like Dialogic, Brooktrout, etc., and are used in IVR (Interactive Voice Response) systems. A TDD Baudot receiver/transmitter can be designed with the above techniques using these cards as well.

One issue to consider in this approach is voice mode/data mode switching in the modem and autodetection issues. Many modems which support ITU or Bell data standards such as Bell 103, V.22bis, V.32, V.34, etc., and support voice record/playback, will be in either data mode or voice mode, but not both. In other words, if the modem is in voice mode it will not support data connections, and if the modem is in data mode it will not support voice record/playback. On call originate it is desirable to detect and connect both to TDD Baudot devices as well as modems supporting ITU or Bell data standards.

Suppose a call is dialed out over the POTS in voice mode, ready for a TDD Baudot connection, but the call is answered by a V.32 ITU data modem. The voice/data modem must detect this V.32 answer tone and switch to data mode to begin the modem handshake leading to a V.32 data connection. A desirable feature on call originate is to put a voice recording on the POTS line which announces that the call is a modem or TDD call. This will alert a person answering the call that a modem or TDD is needed to answer the call. Similarly, if the call is dialed out with the modem in data mode, and a TDD Baudot device answers with its 1400/1800 FSK modulation, then the voice/data modem must be able to recognize this modulation and switch to voice mode to support the TDD reception/transmission. Any voice/data switching must of course be done without hanging up the call due to a modem reset. If the voice/data modem answers a call, there are several techniques possible for voice, data modem, fax, and TDD detection so that the proper modem mode is started. One desirable sequence is to answer the call and begin listening for any identification tones on the line such as fax calling tones, TDD Baudot tones, Turbo-Code (TM) ID tones, or other modem ID tones. If any ID tones are detected then the voice/data modem should switch to the appropriate mode and begin operation which matches the originating device.

In the cases of a voice call, many TDD Baudot modem calls, many ITU or Bell data modem calls, and so on, there will not be any ID tones present from the originating device or person so some active interrogation must be started to elicit a response from the originating side. This response must be detected and acted upon appropriately. One answering sequence might be to begin a voice recording which says "please press one on your touchtone pad." In this case the voice/data modem must listen for a DTMF "one" from a phone dial pad. Alternatively, the voice recording could say, "if this is a voice call please say 'voice'". In this case the voice/data modem will monitor for voice sounds, specifically a voice stating the word(s) requested.

A second method might be to begin Bell or ITU data modem answer tones for protocols such as Bell 103, V.32, V.34, etc. These answer tones could be generated by the voice/data modem in either voice mode or data mode. Voice mode would have the advantage that a Bell/ITU data modem response could be checked for, and techniques of manipulating the answer tone abort time could be employed to shorten the data connection attempt and speed response to a TDD Baudot caller.

If the Bell/ITU data connection attempt is not successful then the third method would be to emit Baudot TDD tones. Other answering sequences are certainly possible and are apparent. It is noted that if TDD Baudot tones are emitted prior to the Bell/ITU answer tones there is the danger that an originating Bell/ITU modem might respond to these Baudot tones with further handshake tones and thereby create a potential problem in that the voice/data modem is in voice mode and not data mode and is not ready for a data handshake. In this eventuality, the voice/data modem would need to immediately switch to data mode and continue the Bell/ITU modem handshake.

8. Indirection Dialers

It sometimes happens that a call cannot be made "directly" to a desired call recipient. In these cases, an "indirection dialer" or indirection phone book may be made available in software. Such a phone book will be programmed with the extra necessary steps needed to make the call. The user interface may be a "point and click" display where the caller simply points at the person to be called and clicks "dial," "ok," or etc. The indirection dialer or phone book may be preprogrammed with the additional steps needed to make the call. Ideally, the user need not take any additional steps other than selecting the person or organization to call and all the additional steps occur automatically.

An example of an indirection phone book is a call made from one network communication system 10 to another network 52, where the link between the is over the POTS or a LAN/WAN/Internet link.

In this case, the indirection phone book or dialer will be preprogrammed with the phone number, IP address, or etc. of the remote network 52. Selecting a person, organization, or etc. and then "dial," "ok," etc. will cause the software to call or contact the remote network 52 system using the POTS number or IP address provided and automatically provide the target user name or other unique identifier to the remote network 52. A ring box will then appear on the destination node computer(s) if possible. This feature makes calling a remote node user from a node 48 similar to calling a local node user within the same network domain.

Another example of an indirection phone book is a software feature to allow an outside PSTN or LAN/WAN caller to place a call to a node user without traversing the network communication system 10 menus. In this case, the indirection phone book will send information to the answering modem 12 or network communication system 10 needed to complete the call, and querying the caller for such information will not be needed. So, as an example, the "outside" caller may simply select "Bob Smith" on his dialer (where Bob Smith is a node client in the network communication system 10 domain), click "dial" or "ok," and wait until Bob answers, Bob's mailbox is made available, or information as to an unsuccessful attempt is provided to the caller.

The invention may be embodied in other specific forms without departing from its spirit or essential characteristics. The described embodiments are to be considered in all respects only as illustrative and not restrictive. Any explanations provided herein of the scientific principles employed in the present invention are illustrative only. The scope of the invention is, therefore, indicated in the appended claims rather than by the foregoing description. All changes within the meaning and range of the claims are to be embraced within their scope.

What is claimed is:

1. A network communication system for transferring a call from a local user to a plurality of node users, comprising:
    a local device configured to transmit call data representative of the call and generate a call indicator;
    a plurality of nodes in electrical communication with the local device and configured to generate a ring message in response to receipt of the call indicator, each node having,
        an output device for displaying the ring message, and
        an input device for entering response data in response to the ring message; and
    a server in electrical communication with the local device and the plurality of nodes to regulate call data and response data.

2. The network communication system of claim 1, wherein the call data comprises text data.

3. The network communication system of claim 1, further comprising a modem in electrical communication with the local device, the modem configured to establish a carrier connection with a remote device to receive the call from the remote device, the local device configured to convert call data into a format suitable for transfer from the local device to a node.

4. The network communication system of claim 3, wherein the modem maintains a carrier connection with the remote device during transfer of the call.

5. The network communication system of claim 1, wherein each node is configured to generate response data representative of node user inputs and transfer the response data to the local device to thereby enable real time communication between nodes and the local device.

6. The network communication system of claim 1, wherein the call indicator includes identification data for identifying the call.

7. The network communication system of claim 1, wherein each node includes a node module having,
    a call indicator module configured to recognize receipt of a call indicator;
    a ring message generation module configured to generate a ring message displayable on the output device in response to receipt of the call indicator;
    a user interface module configured to recognize node user responses to the ring message; and
    a response generation module configured to generate response data representative of node user responses.

8. The network communication system of claim 6, wherein the node module comprises a browser for interfacing with the world wide web.

9. The network communication system of claim 6, wherein the ring message generation module generates a visual display on the output device.

10. The network communication system of claim 6, wherein the ring message generation module generates an audible indicator on the output device.

11. The network communication system of claim 6, wherein the ring message generation module generates input options to accept and decline the call.

12. The network communication system of claim 10, wherein the ring message generation module generates input options to request further identification data on the call.

13. The network communication system of claim 1, wherein the local computer includes a local module having,
    a node selection module configured to transmit the call indicator to selected nodes;
    a response module configured to identify response data from a node; and
    a call transfer module configured to transmit call data to a node in response to receiving response data indicating an acceptance of the call.

14. The network communication system of claim 1, wherein the local modem is capable of communicating through TDD, ITU, and VOICE signals.

15. A method for transferring a call across a network system, comprising:
    generating a call indicator indicative of a call;
    transmitting the call indicator across the network system to a plurality of nodes;
    displaying a ring message on the nodes in response to the call indicator;
    generating affirmative response data indicative of an acceptance of the call by an accepting node;
    transmitting call data representative of the call to the accepting node; and
    the accepting node responding to call data.

16. The method of claim 15, wherein the call data comprises text data.

17. The method of claim 15 further comprising selecting the plurality of nodes to receive the call indicator.

18. The method of claim 17, wherein selecting the plurality of nodes is based on predetermined grouping of the nodes.

19. The method of claim 15 wherein transmitting call data representative of the call to the accepting node prevents transmission of the call data to another node.

20. The method of claim 15 further comprising transferring call data from the accepting node to another node.

21. The method of claim 15 further comprising receiving the call from a remote device through a modem.

22. The method of claim 21, further comprising:
    the modem establishing a carrier connection with the remote device;
    maintaining the carrier connection during transfer of the call to a node; and
    a local device converting the call into call data suitable for transmission across the network.

23. The method of claim 15 wherein the call indicator includes identification data for identifying the call.

24. The method of claim 23, further comprising a node requesting additional identification data.

25. The method of claim 15, further comprising displaying ring messages on output devices of the nodes, the ring messages including identification of the call and options to accept and decline the call.

26. A computer readable medium having stored thereon computer executable instructions for performing a method for transferring a call across a network, the method comprising:
generating a call indicator indicative of a call;
transmitting the call indicator across the network system to a plurality of nodes;
displaying a ring message on the nodes in response to the call indicator;
generating affirmative response data indicative of an acceptance of the call by an accepting node; and
transmitting call data representative of the call to the accepting node.

27. The computer readable medium of claim 26, wherein the response data comprises text data.

28. The computer readable medium of claim 26, further comprising selecting the plurality of nodes to receive the call indicator.

29. The computer readable medium of claim 28, wherein selecting the plurality of nodes is based on predetermined grouping of the nodes.

30. The computer readable medium of claim 26, wherein transmitting call data representative of the call to the accepting node prevents transmission of the call data to another node.

31. The computer readable medium of claim 26, further comprising transferring call data from the accepting node to another node.

32. The computer readable medium of claim 26, wherein the call indicator includes identification data for identifying the call.

33. The computer readable medium of claim 26, further comprising displaying ring messages on output devices of the nodes, the ring messages including identification of the call and options to accept and decline the call.

* * * * *